United States Patent
Picard et al.

(10) Patent No.: US 6,900,408 B2
(45) Date of Patent: May 31, 2005

(54) CENTRALIZED CONTROL ARCHITECTURE FOR A PLASMA ARC SYSTEM

(75) Inventors: Tate S. Picard, Enfield, NH (US); Roger E. Young, Canaan, NH (US); Gregory S. Wilson, Newbury, NH (US); Ronald M. Huppe, Windsor, VT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 10/874,569

(22) Filed: Jun. 23, 2004

(65) Prior Publication Data

US 2004/0226921 A1 Nov. 18, 2004

Related U.S. Application Data

(63) Continuation of application No. 09/546,036, filed on Apr. 10, 2000, now Pat. No. 6,772,040.

(51) Int. Cl.$^7$ ................................................ B23K 9/00
(52) U.S. Cl. ........................... 219/121.55; 219/121.51; 219/121.59
(58) Field of Search ................. 219/121.11, 121.36, 219/121.48, 121.5, 121.51, 121.54, 121.55, 121.59; 313/231.31; 700/108, 117, 174

(56) References Cited

U.S. PATENT DOCUMENTS

| | | | |
|---|---|---|---|
| 4,101,754 A | 7/1978 | Fischer | 219/121 |
| 4,133,988 A | 1/1979 | Esibyan et al. | 219/121 |
| 4,156,125 A | 5/1979 | Brown | 219/124.02 |
| 4,170,727 A | 10/1979 | Wilkins | 219/121 |
| 4,195,216 A | * 3/1980 | Beauchamp et al. | 219/121.54 |
| 4,225,769 A | 9/1980 | Wilkins | 219/130.4 |
| 4,363,468 A | 12/1982 | Noe | 266/76 |
| 4,775,774 A | 10/1988 | Caneer, Jr. | 219/121.55 |
| 4,814,577 A | 3/1989 | Dallavalle et al. | 219/121.57 |
| 4,996,407 A | 2/1991 | Traxler | 219/121.54 |
| 5,017,752 A | 5/1991 | Severance, Jr. et al. | 219/121.59 |
| 5,039,837 A | 8/1991 | Nourbakhsh et al. | 219/121.48 |
| 5,070,227 A | 12/1991 | Luo et al. | 219/121.55 |
| 5,166,494 A | 11/1992 | Luo et al. | 219/121.55 |
| 5,189,277 A | 2/1993 | Boisvert et al. | 219/121.48 |
| 5,225,658 A | 7/1993 | Yamaguchi et al. | 219/121.57 |
| 5,232,196 A | 8/1993 | Hutchings et al. | 251/129.08 |
| 5,272,312 A | 12/1993 | Jurca | 219/121.83 |
| 5,288,970 A | 2/1994 | Nishi | 219/121.56 |
| 5,290,995 A | 3/1994 | Higgins et al. | 219/121.44 |
| 5,326,955 A | 7/1994 | Nishi et al. | 219/121.56 |
| 5,380,976 A | 1/1995 | Couch, Jr. et al. | 219/121.44 |
| 5,396,043 A | 3/1995 | Couch, Jr. et al. | 219/121.5 |
| 5,414,236 A | 5/1995 | Couch, Jr. et al. | 219/121.39 |
| 5,424,507 A | 6/1995 | Yamaguchi | 219/121.44 |
| 5,521,350 A | 5/1996 | Nishi et al. | 219/121.56 |
| 5,522,424 A | 6/1996 | Dalton, Jr. et al. | 137/560 |

(Continued)

FOREIGN PATENT DOCUMENTS

| | | |
|---|---|---|
| DE | 19536150 A1 | 4/1997 |
| EP | 0 998 174 B1 | 8/2004 |

OTHER PUBLICATIONS

Rogozinski, M.W. et al., "Development of a "Smart" Plasma Arc Cutting System", National Conference Publication 1994; vol. 1, No. 94/11, pp. 365–370.

Primary Examiner—Tu Hoang
(74) Attorney, Agent, or Firm—Proskauer Rose LLP

(57) ABSTRACT

The invention features a centralized control architecture for a closely-coupled plasma arc system, in which the "intelligence" of the system is integrated into a single controller. The closely-coupled plasma arc system includes a power source, an automatic process controller and a torch-height controller, where each of these components individually has a closed-loop dynamic relationship with the controller.

17 Claims, 23 Drawing Sheets

U.S. PATENT DOCUMENTS

| | | | |
|---|---|---|---|
| 5,591,357 A | 1/1997 | Couch, Jr. et al. | 219/121.39 |
| 5,614,110 A | 3/1997 | Shintani et al. | 219/121.44 |
| 5,653,896 A | 8/1997 | Couch, Jr. et al. | 219/121.44 |
| 5,695,662 A | 12/1997 | Couch, Jr. et al. | 219/121.39 |
| 5,698,480 A | 12/1997 | Geiman et al. | 442/181 |
| 5,717,187 A | 2/1998 | Rogozinski et al. | 219/121.54 |
| 5,756,960 A | 5/1998 | Rogozinski et al. | 219/121.54 |
| 5,801,355 A | 9/1998 | Saio et al. | 219/121.44 |
| 5,844,196 A | 12/1998 | Oakley | 219/121.54 |
| 5,866,869 A | 2/1999 | Schneider et al. | 219/121.39 |
| 5,866,872 A | 2/1999 | Lu et al. | 219/121.56 |
| 5,893,986 A | 4/1999 | Oakley et al. | 219/121.59 |
| 6,021,682 A | 2/2000 | Zeng | 73/866 |
| 6,028,287 A | 2/2000 | Passage et al. | 219/121.56 |
| 6,121,570 A | 9/2000 | Oakley et al. | 219/121.51 |
| 6,274,841 B1 * | 8/2001 | Ramakrishnan et al. | 219/121.44 |
| 6,274,842 B1 * | 8/2001 | Warren et al. | 219/121.44 |
| 6,332,463 B1 | 12/2001 | Farrugia et al. | 128/204.18 |
| 6,420,672 B1 * | 7/2002 | Ulrich et al. | 219/121.39 |
| 6,469,274 B1 * | 10/2002 | Delzenne et al. | 219/121.44 |

\* cited by examiner

FIG. 4

| | PFC1 | PFC2 | |
|---|---|---|---|
| Preflow Setting | 0 | 0 | psig |
| Ignition Setting | | 0 | psig |
| Outflow Setting | | 0 | psig |
| Rampdown Setting | 0 | 0 | psig |
| Shutoff Setting | 0 | 0 | psig |
| Postflow Setting | 0 | 0 | psig |
| Postflow Delay | 0 | 0 | sec |
| Postflow Time | 0 | 0 | sec |

| | | |
|---|---|---|
| Supply On Time | 0 | sec |
| Preflow Time | 0 | sec |
| Purge Time | 0 | sec |
| Pierce Time | 0 | sec |
| Creep Time | 0 | sec |
| Rampdown Delay | 0 | sec |

| | | |
|---|---|---|
| Power Supply Type | HT2000 RevE | |
| Torch Type | MAX200 | |
| Material Type | Mild Steel | |
| Current Setting | 200A | |
| Plasma/Shield Gases | Air/Air | |
| Cutting Surface | Above Water | |
| Material Thickness | 3/16" | |
| Water Muffler | Not Installed | |
| Cut Speed | 600 | rpm |
| Kerf | 0.2 | in |
| Set Arc Voltage | 50 | volts |
| Cut Height | 0.01 | in |
| Pierce Height | 200 | % | 0.02 in |
| Retry on Transfer Fail | 0 | times |

[Save Data] [Reset Data] [Save Database] [Reset Database] [Test Gas] [Done]

FIG. 5B

CENTRALIZED CONTROL ARCHITECTURE FOR A PLASMA ARC SYSTEM

RELATED APPLICATIONS

This application is a continuation of patent application Ser. No. 09/546,036, filed on Apr. 10, 2000 now U.S. Pat. No. 6,772,040, the entire disclosure of which is incorporated herein by reference.

FIELD OF THE INVENTION

The present invention relates to a centralized control architecture for operating a plasma arc system.

BACKGROUND OF THE INVENTION

Plasma arc systems are widely used for cutting metallic materials and can be automated for automatically cutting a metallic workpiece. In general, a plasma arc system includes a plasma arc torch, an associated power supply, a remote high-frequency (RHF) console, a gas supply, a positioning apparatus, a cutting table, a torch height control, and an associated computerized numeric controller. FIG. 1 shows an example of a plasma arc system.

In operation, a user places a workpiece on the cutting table and mounts the plasma arc torch on the positioning apparatus to provide relative motion between the tip of the torch and the workpiece to direct the plasma arc along a processing path. The user provides a start command to the computerized numeric controller (CNC) to initiate the cutting process. The CNC accurately directs motion of the torch and/or the cutting table to enable the workpiece to be cut to a desired pattern. The CNC is in communication with the positioning apparatus. The positioning apparatus uses signals from the CNC to direct the torch along a desired cutting path. Position information is returned from the positioning apparatus to the CNC to allow the CNC to operate interactively with the positioning apparatus to obtain an accurate cut path.

The power supply provides the electrical current necessary to generate the plasma arc. The power supply has one or more dc power modules to produce a constant current for the torch. Typically, the current can be set to discreet values. The power supply has a microprocessor, which regulates essentially all plasma system functions, including start sequence, CNC interface functions, gas and cut parameters, and shut off sequences. For example, the microprocessor can ramp-up or ramp-down the electrical current. The main on and off switch of the power supply can be controlled locally or remotely by the CNC. The power supply also houses a cooling system for cooling the torch.

The gas console controls flow of plasma and shield gases to the torch. The gas console houses solenoid valves, flow meters, pressure gauges, and switches used for plasma and shield gas flow control. The flow meters are used to set the preflow rates and cut flow rates for the plasma and shield gases. The gas console also has a multi-inlet gas supply area where the required plasma and shield gases can be connected. A toggle switch can be used to select the plasma gases. The plasma and shield gases are monitored by gas pressure gages. In order to operate the gas console, all settings must be manually selected.

The RHF console houses a high frequency starting circuit that is used to fire the torch. The RHF console also houses a cathode manifold used to interface power and coolant leads between the power supply and the torch. The power and coolant leads and a pilot arc lead make up a shielded torch lead set which connects with the torch. In addition, gas lines are also supplied to the torch to supply gas.

The torch height control sets the height of the torch relative to the work piece. The torch height control, typically, has its own control module to control an arc voltage during cutting by adjusting the standoff, (i.e., the distance between the torch and the work piece), to maintain a predetermined arc voltage value. The torch height control has its own external control module to control the standoff. The torch height control has a lifter, which is controlled by the control module through a motor, to slide the torch in a vertical direction relative to the work piece to maintain the desired voltage during cutting.

The plasma arc torch generally includes a torch body, an electrode mounted within the body, passages for cooling fluid and cut and shield gases, a swirl ring to control the fluid flow patterns, a nozzle with a central exit orifice, and electrical connections. A shield can also be provided around the nozzle to protect the nozzle and to provide a shield gas flow to the area proximate the plasma arc. Gases applied to the torch can be non-reactive (e.g. argon or nitrogen) or reactive (e.g. oxygen or air).

In operation, the tip of the torch is positioned proximate the workpiece by the positioning apparatus. A pilot arc is first generated between the electrode (cathode) and the nozzle (anode) by using, for example, a high frequency, high voltage signal from the RHF console. The pilot arc ionizes gas from the gas console passing through the nozzle exit orifice. As the ionized gas reduces the electrical resistance between the electrode and the workpiece, the arc transfers from the nozzle to the workpiece. The torch is operated in this transferred plasma arc mode, which is characterized by the conductive flow of ionized gas from the electrode to the workpiece, to cut the workpiece.

The plasma arc system as described above has high cycle time. First, a torch operator must know some basic cutting parameters, such as the material to be cut, the thickness of the workpiece, and the plasma gas to be used. Then, the operator must review a series of tables found in books to manually set many parameters such as the power settings on the power supply or the gas flow on the gas console. Having to look up additional parameters takes time and may result in operator error as manual input can be inaccurate.

In addition, some components such as the torch height control and the power supply have their own control, which can be redundant. Furthermore, there is no feedback mechanism between the components of the plasma arc system to optimize the operation of the plasma arc system.

SUMMARY OF THE INVENTION

The present invention relates to a control architecture for a plasma arc cutting system. In particular, the invention relates to a centralized control architecture for a plasma arc cutting system, in which the "intelligence" of the system is integrated into a single controller.

In one aspect, the invention features a method of controlling an integrated plasma arc system. According to one embodiment of the method, a first group of process parameters are input into a controller. A second group of process parameters are generated based on the first group of process parameters. At least one command signal is provided from the controller to at least one auxiliary device to control an output parameter generated by the at least one auxiliary device. At least one auxiliary device is either a power supply or an automatic process controller. The output parameter generated by the auxiliary device is detected and the command signal provided to the auxiliary device is adjusted based on the detected output parameter.

At least one auxiliary device can be the automatic process controller. The pressure of gas exiting the automatic process controller can be detected and the command signal provided to the automatic process controller for controlling the gas flow can be adjusted based on the pressure. At least one auxiliary device can be the power supply. A feedback signal generated by the power supply indicative of an arc voltage at the plasma arc torch can be detected and the command signal provided to the power source for controlling a current output can be adjusted based on the feedback signal.

At least one auxiliary device can include a first auxiliary device and a second auxiliary device. A first output parameter generated by the first auxiliary device can be detected and the command signal provided to the second auxiliary device can be adjusted based on the first output parameter. For example, the first auxiliary device can be the automated process controller and the second auxiliary device can be the power supply. The pressure of an outlet gas exiting the automated process controller can be detected and the command signal provided to the power supply for controlling an output current can be adjusted based on the pressure. A feedback signal generated by the power supply indicative of an arc voltage of the plasma arc torch can be detected and the command signal provided to the automatic process controller for controlling the gas flow can be adjusted based on the feedback signal. Alternatively, the first auxiliary device can be the power supply and the second auxiliary device can be a torch height controller. The feedback signal generated by the power supply can be detected and the command signal provided to the torch height controller for controlling a standoff can be adjusted based on the feedback signal.

The method of controlling the integrated plasma arc system can also include the step of monitoring a life of a consumable of the plasma arc torch. The life of the consumable can be monitored and the command signal provided to at least one auxiliary device can be adjusted based on the monitored life of the consumable. The pressure of gas exiting the automatic process controller and/or the arc voltage at the torch can be compared to a reference value to determine the wear of the consumable. The flow rate of gas provided to the plasma arc torch and/or the cutting current can be adjusted to compensate for the wear of the consumable.

In another aspect, the invention features a method of controlling an operation of a plasma arc torch system, which includes an automatic process controller in electrical communication with a computerized numeric controller and in fluidic communication with a plasma arc torch. The automatic process controller has at least one valve and at least one sensor. According to the method, a command signal is provided from the computerized numerical controller to the valve to control a flow of at least one gas to the plasma arc torch. A condition of the gas exiting the automatic process controller is monitored using the sensor. The command signal provided to the valve is adjusted based on the monitored condition.

In one embodiment, a first command signal is provided to a first valve to control the flow of a cut gas and a second command signal is provided to a second valve to control the flow of a shield gas. The pressure of the cut gas is monitored using a first pressure transducer and the pressure of the shield gas is monitored using the second pressure transducer. The first command signal provided to the first valve is adjusted based on the pressure of the cut gas monitored by the first pressure transducer. The second command signal provided to the second valve is adjusted based on the pressure of the shield gas monitored by the second pressure transducer.

In one aspect, the invention features a controller for an integrated plasma arc system. The controller includes an input module, a reference module, at least one interface module, and a detection module. The input module receives a first group of process parameters from a user for operating the plasma arc system. The reference module generates a second group of process parameters for operating the plasma arc system based on the first group of process parameters. At least one interface module interfaces with at least one auxiliary device of the plasma arc system and provides at least one command signal to the auxiliary device to control an output parameter generated by the auxiliary device. At least one of the auxiliary device is a power supply or an automatic process controller. The detection module monitors the output parameter generated by the auxiliary device and adjusts the command signal provided to the auxiliary device.

The auxiliary device can be a power supply and the detection module can monitor a current output generated by the power supply. The auxiliary device can be an automatic process controller for controlling gas flow to the plasma arc torch and the detection module can monitor pressure of the gas and adjust the command signal provided to a valve in the automatic process controller based on the pressure. The gas can be a cut gas and/or a shield gas.

In another aspect, the invention features a control system for controlling an operation of a plasma arc system. The control system includes an automatic process controller and a computerized numerical controller (CNC) in electrical communication with the automatic process controller. The automatic process controller includes at least one valve for controlling a flow of at least one gas to a plasma arc torch and at least one sensor for monitoring a condition of the gas. The CNC generates at least one command signal for operating at least one valve, receives the condition monitored by at least one sensor, and adjusts the command signal based on the condition monitored by the sensor.

The automatic process controller can include a first manifold for controlling flow of a cut gas and a second manifold for controlling flow of a shield gas. Two cut gases can be mixed in the first manifold. The automatic process controller can include a first proportional flow control valve positioned upstream of the first manifold for controlling a cut gas flow to the first manifold and a first pressure transducer positioned downstream from the first manifold to measure pressure of the cut gas exiting the first manifold. The automatic process controller can include a second proportional flow control valve positioned upstream of the second manifold to control a shield gas flow to the second manifold and a second pressure transducer positioned downstream from the second manifold to measure pressure of the shield gas exiting the second manifold. The first proportional flow control valve can be adjusted based on the pressure of the cut gas measured by the first pressure transducer. The second proportional flow control valve can be adjusted based on the pressure of the shield gas measured by the second pressure transducer.

In another aspect, the invention features an integrated plasma arc system. The system includes a controller, a power source, a plasma arc torch, an automatic process controller, and a torch height controller. The power source is in electrical communication with the controller. The power source generates an electrical current sufficient to form a plasma arc. The plasma arc torch is in electrical communication with the power source through a torch lead. The automatic process controller is in electrical communication with the controller. The automatic process controller is positioned to control delivery of gas from the power source to the plasma arc torch. The torch height controller is in electrical communication with the controller. The torch height controller is positioned to control a standoff between the plasma arc torch and a workpiece. The controller is physically remote from the power supply, the torch height controller and the automatic process controller. The controller controls, monitors and adjusts an output parameter of each of the power supply, the automatic process controller and the torch height controller for operation of the plasma arc system.

In one embodiment, the system also includes a table and a drive system for moving the plasma arc torch over a cutting surface of the table. The controller provides a command signal to the drive system to position the drive system and receives a feedback signal from the drive system to monitor a position of the drive system.

In another aspect, the invention features a plasma arc system which includes a power source and a controller in electrical communication with and physically remote from the power source. The power source generates an electrical current sufficient to form a plasma arc in a plasma arc torch. The controller controls, monitors, and adjusts the electrical signal generated by the power source.

The power source can include an input, a switch, a main transformer, at least one dc power module, and torch ignition circuitry. The input receives an input signal. The switch can be in electrical communication with the input and the controller. The switch can receive a switch command signal from the controller to open or close the switch. The main transformer can be in electrical communication with the switch to receive the input signal when the switch is closed and generates an AC output signal. The dc power module can be in electrical communication with the main transformer and the controller. The dc power module can receive the AC output signal from the main transformer and a dc power module command signal from the controller. The dc power module can generate a rectified DC output signal and provide a dc power module feedback signal to the controller. The torch ignition circuitry can be in electrical communication with the dc power module to receive the rectified DC output signal and generate the electrical current sufficient to form the plasma arc.

The controller can provide a command signal corresponding to a desired rectified DC output signal to the dc power module. The controller can provide a command signal to the dc power module to ramp up or ramp down the rectified output signal.

The power supply can also include a transformer in electrical communication with the input and the controller and a switching supply in electrical communication with the control transformer and the controller. The power supply can also include a heat exchanger. The heat exchanger can have the same electrical potential as the electrode of the plasma arc torch. The heat exchanger includes a coolant, and the controller can monitor the flow rate, the flow level, and/or the temperature of the coolant. The power supply can also include a voltage feedback card. The voltage feedback card can be in electrical communication with the torch ignition circuitry and the controller. The voltage feedback card can monitor the rectified DC output signal from the dc power module and provide a voltage feedback signal to the controller. The voltage feedback card can signal the controller when a pilot arc is established, and/or when cutting arc is established.

In another aspect, the invention features a method of controlling a power supply of a plasma arc system which includes a controller in electrical communication with the power supply. According to the method, a command signal is provided from the controller to the power supply to generate an electrical current sufficient to form a plasma arc in a plasma arc torch. The electrical current generated by the power supply is monitored. The command signal provided from the controller to the power supply is based on the electrical current monitored.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 4 is a screen shot of a controller display screen according to one embodiment of the present invention.

FIG. 5B is a screen shot of a change consumables screen of a controller according to one embodiment of the present invention.

DETAILED DESCRIPTION

The present invention relates to a centralized control architecture for a plasma cutting system, in which the "intelligence" of the system is integrated into a single controller. The centralized control architecture eliminates redundant hardware and software and integrates the entire system, thereby improving performance and reducing cycle time. The plasma arc system including the centralized control architecture, will be referred to herein as a closely-coupled plasma arc system or simply a plasma arc system.

Figure 1:
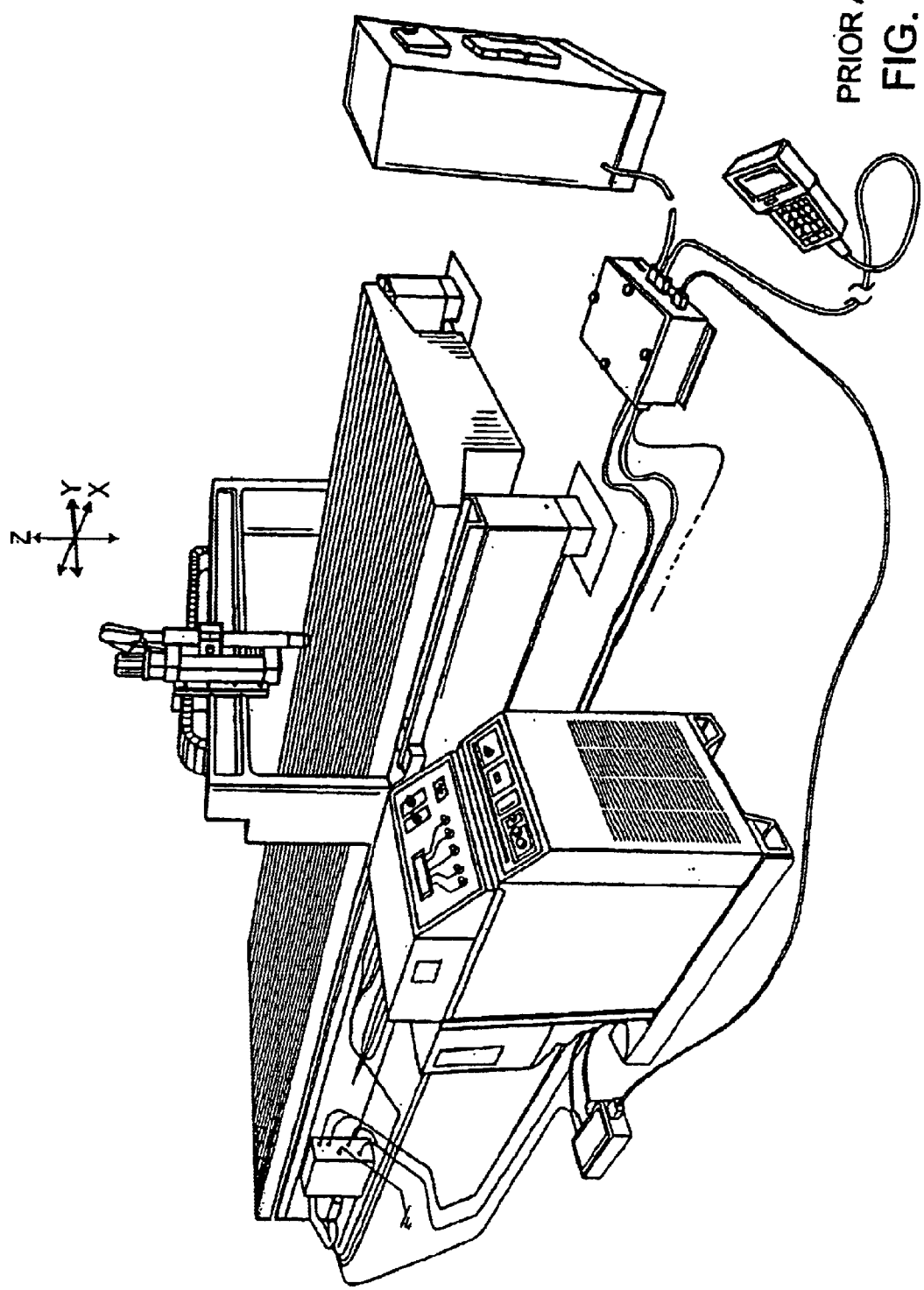
FIG. 1 is a schematic diagram of an automated plasma arc system.
Figure 2:
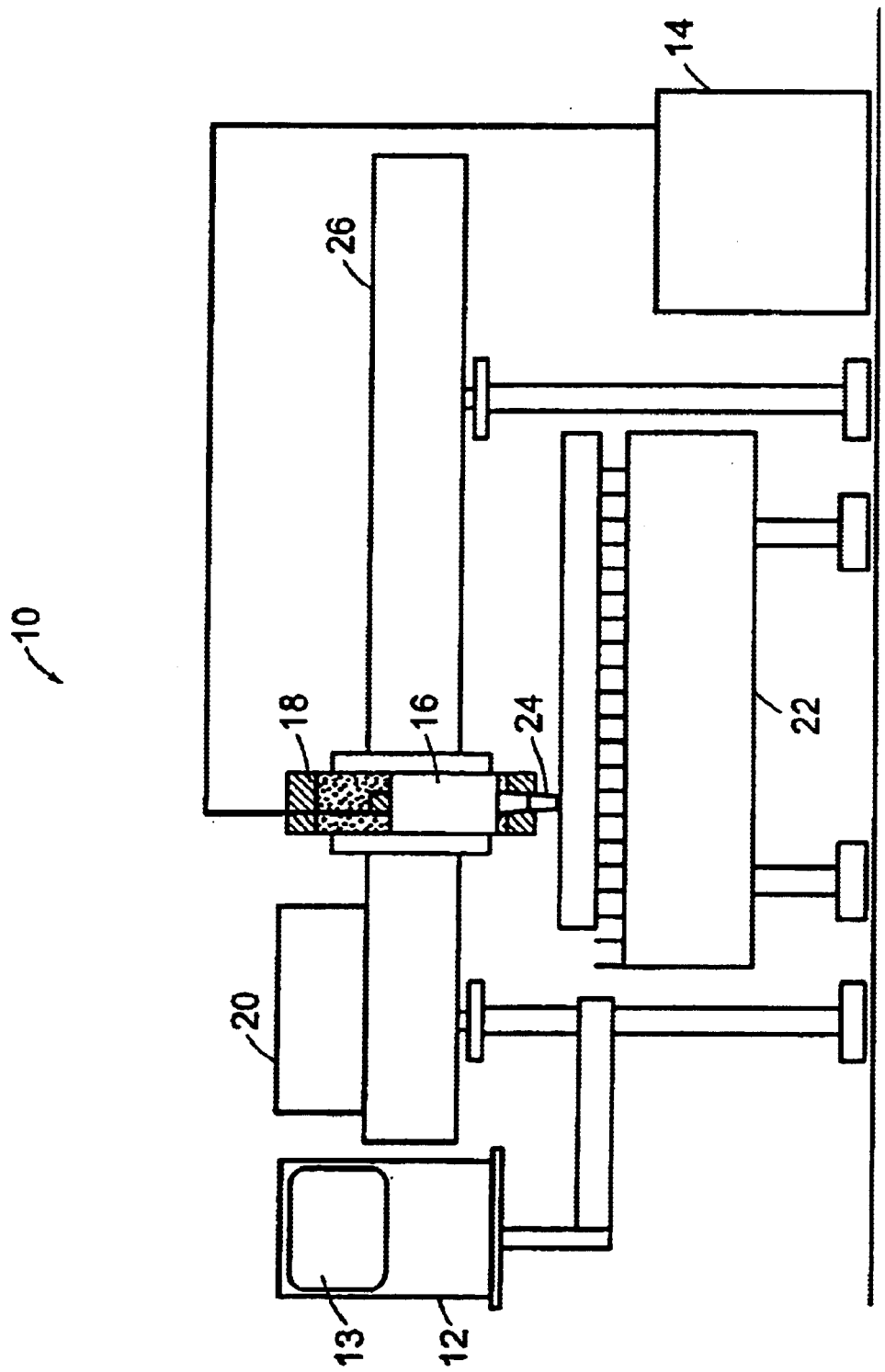
FIG. 2 is a schematic diagram of a closely-coupled plasma arc system according to one embodiment of the present invention.

Referring to FIG. 2, a closely-coupled plasma arc system 10 includes a computerized numeric controller (CNC) 12, a display screen 13, a power supply 14, an automatic process controller 16, a torch height controller 18, a drive system 20, a cutting table 22, and a plasma arc torch 24.

In general, the CNC 12 controls the motion of the plasma arc torch 24 over the cutting table 22 and the timing of the cutting process as the process relates to the motion. In the present invention, the CNC 12 is capable of controlling, not only the motion of the plasma arc torch 24, but also the operation of the other components of the plasma arc system 10, as well as other cutting processes. The various components of the plasma arc system 10 can be controlled by the CNC 12 concurrently.

The CNC 12 interfaces with the user. The CNC 12 allows the user to select or provide certain process parameters. The CNC 12 generates other process parameters necessary to operate the plasma arc system 10 based on the user selection and/or input. A cut program 600 as later shown in FIG. 16, provides part specific information for torch motion and cutting arc operation. The CNC 12 commands the power supply 14, the automatic process controller 16, the torch height controller 18 and the drive system 20 to operate. The CNC 12 also monitors certain process conditions to determine whether the plasma arc system 10 is operating properly. Based on the monitored information, the CNC 12 adjusts the operation of the other components of the plasma arc system 10, if necessary. Details of the CNC 12 will be described in greater detail in reference to FIGS. 3, 4, 5A–5B, and 15–20.

The power supply 14 generates a high frequency signal sufficient to ionize a gas to generate a plasma arc and a DC signal to maintain the arc. In the present invention, all intelligence and adjustment controls for configuring the cut process typically provided in a power supply have been migrated into the CNC 12 and/or the automatic process controller 16. Upon receiving an appropriate command signal from the CNC, the power supply 14 transforms an input signal into an output signal sufficient to generate and maintain a plasma arc. Several components of the power supply 14, including the output generated by the power supply 14 are controlled by the CNC 12 through a feedback mechanism. The power supply 14 will be discussed in greater detail in reference to FIGS. 6 and 7A–7C.

The automatic process controller 16 is designed to replace the manual gas flow controls that are normally located at the power supply and/or a gas control module. The automatic process controller 16 includes proportional flow control valves to control the flow rate of the cut gas and the shield gas. The automatic process controller 16 also includes pressure transducers for measuring the pressure of the cut gas and the shield gas. This pressure information is provided to the CNC 12, which in turn adjusts the proportional flow control valves if necessary to change the flow rates. The intelligence of the automatic process controller 16 is also located at the CNC 12. The automatic process controller 16 is described in greater detail in reference to FIGS. 8–12.

The torch height controller 18 controls the standoff between the torch 24 and the work piece. Unlike a conventional torch height controller 18, however, the intelligence of the torch height controller 18 is migrated into the CNC 12. The torch height controller 18 is controlled directly from the CNC 12 as a separate servo axis in a manner similar to the drive system 20 in a conventional plasma arc system. The CNC 12 provides a command signal to the torch height controller 18 to adjust the standoff, based on the arc voltage measured at the plasma arc torch 24. The torch height controller 18 is described in greater detail in reference to FIGS. 13 and 14.

The drive system 20 receives command signals from the CNC to move the plasma arc torch 24 in an x or y direction over the cutting table 22. The cutting table 22 supports a work piece. The plasma arc torch 24 is mounted to the torch height controller 18 which is mounted to the gantry 26. The drive system 20 moves the gantry 26 relative to the table 22 and moves the plasma arc torch 24 along the gantry 26. The information about the position of the plasma arc torch 24 is provided to the CNC 12. Thus, the CNC 12 allows interactive response and maintains an accurate cut path. Operation of the drive system 20 and the cutting table 22 do not constitute an inventive aspect of the present invention and are well known to those skilled in the art.

The Computer Numeric Controller

The CNC 12 includes a display, a hard disk, a microprocessor, and random access memory (RAM). The display, for example, can be a Video Graphic Array (VGA) color Double Super Twisted Nematic (DSTN) liquid crystal display (LCD) or an active matrix thin-film-transistor (TFT) display. The CNC 12, for example, can include 2.1 Gigabytes of hard disk and optionally also include a floppy disk drive. The microprocessor, for example, can be 166 MHz Pentium® processor. The CNC 12, for example, can include 32 Mbytes of random access memory (RAM). The CNC 12 can also include conductor lines for interface signals for cutting (e.g., gas control) and motion logic (e.g., tracing system, markers, homing). The motion logic can include logic for tracing systems which direct the torch 24 by tracing a drawing or part. The motion logic can include logic for marking a work piece. The motion logic can also include logic for moving the torch to a home position to provide exact location information to the CNC 12.

Figure 3:
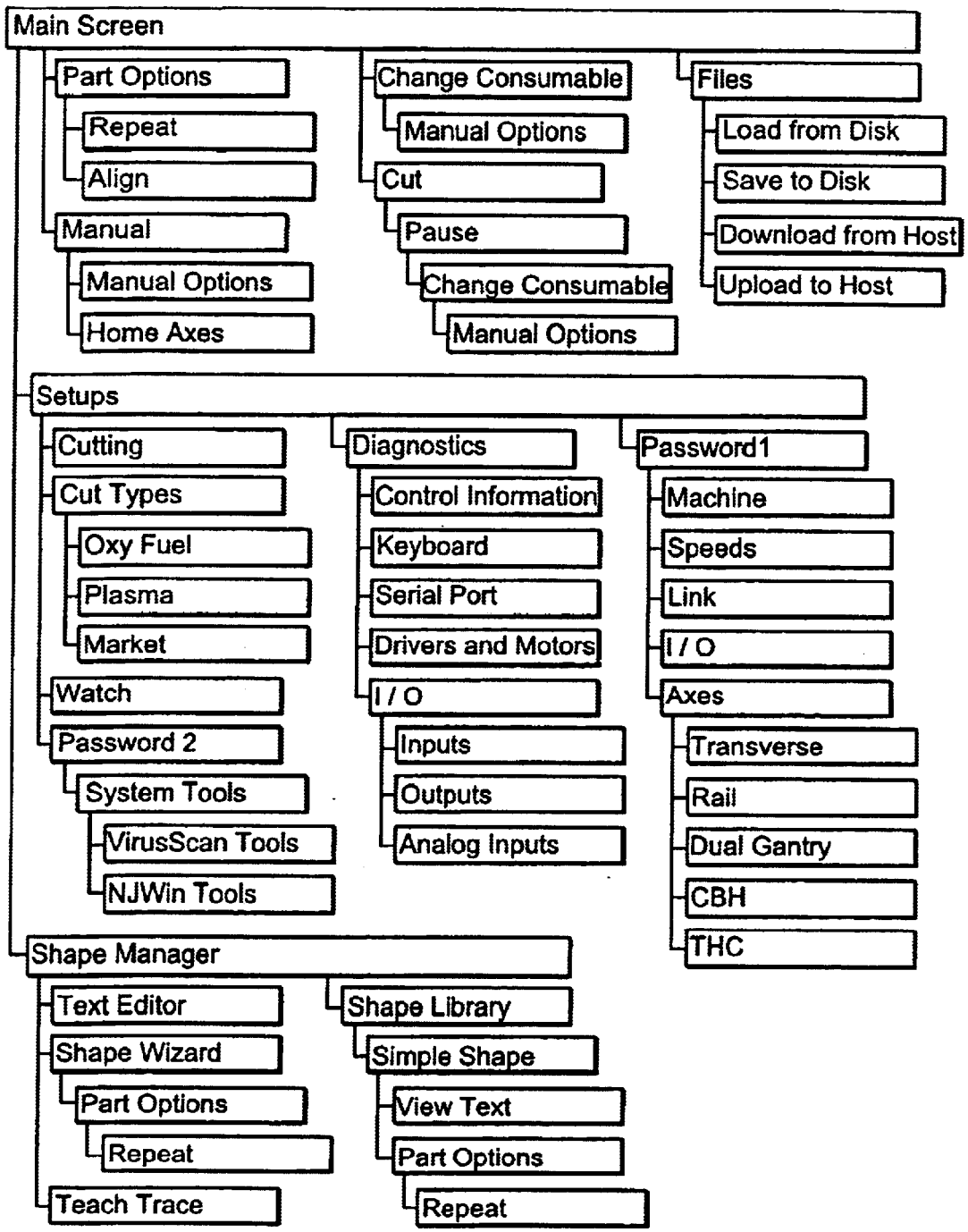
FIG. 3 is a flow chart illustrating a screen hierarchy of the controller according to one embodiment of the present invention.
Figure 5A:
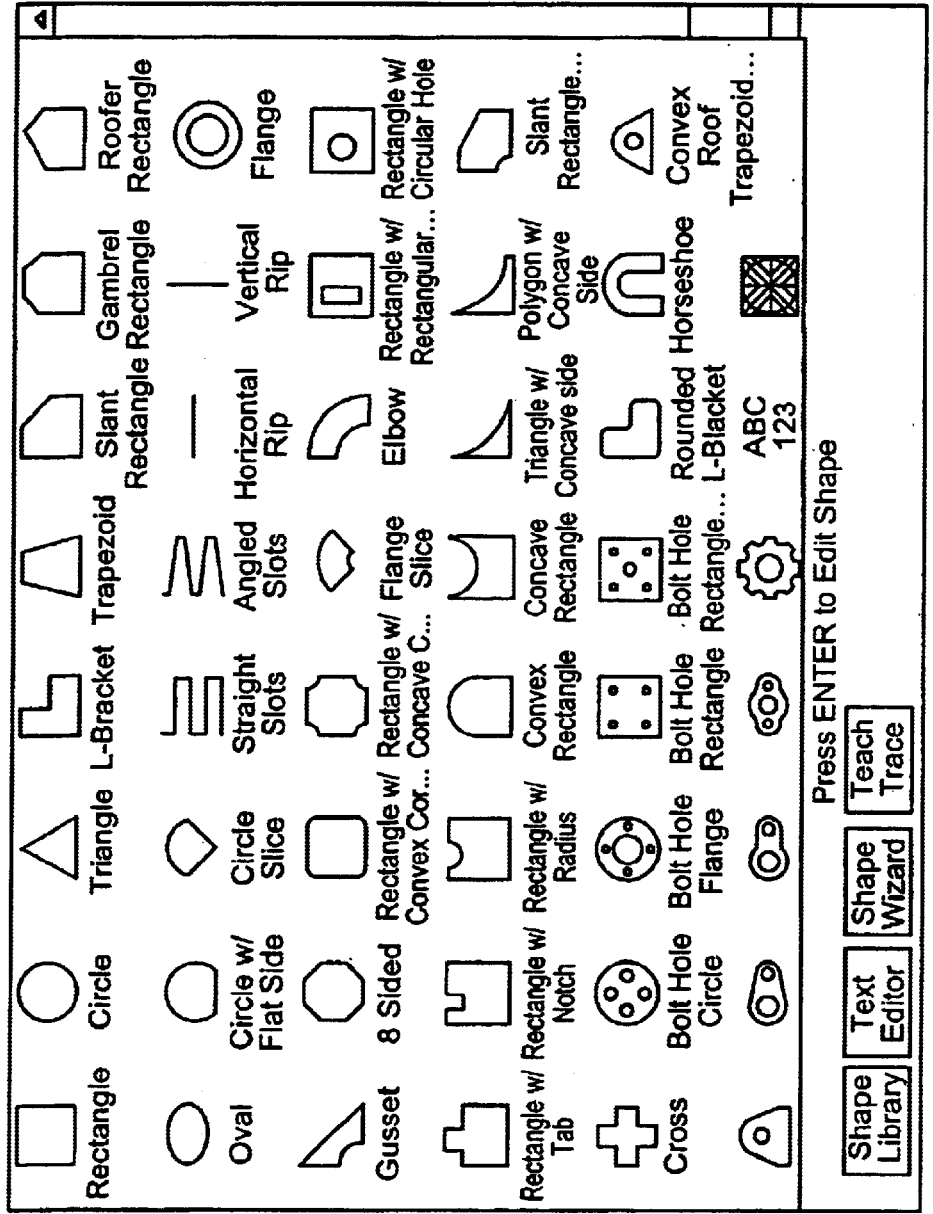
FIG. 5A is a screen shot of a parametric shape library for use in a controller according to one embodiment of the present invention.

The programming and operation of the CNC 12 is menu driven. An example screen hierarchy is illustrated in FIG. 3. In the example shown in FIG. 3, the screen hierarchy is divided into main screen, setups, and shape manager. The main screen, in part, allows a user to select options such as files of information to load or save, choices of part options and to elect manual operation of the closely-coupled plasma arc system 10. The setups screen, in part, allows selection of cutting parameters such as the cut gas to be used. The shape manager, in part, allows the user to select cut patterns from a shape library. The CNC 12 includes a graphical user interface for the user to input certain process parameters. For example, the user can provide information about the type of power supply, the type of torch, the type of material to be cut, the setting for the current, the type of plasma gas and the shield gas, the cutting surface (e.g., above water), the thickness of the material to be cut, and whether the water muffler is installed as shown in FIG. 4. The user can also select any of a number of shapes for cutting from a parametric shape library, along with the desired dimension. An example of a parametric shape library is provided in FIG. 5A.

Based on the user input process parameters, the CNC 12 generates other process parameters. These process parameters can be provided from a factory pre-set database or a user defined database. The generated process parameters can include cut speed, kerf diameter, set arc voltage, cut height, pierce height, and the number of retries upon transfer failure. The process parameters can also include pressure settings for the cut gas and the shield gas during pre-flow, ignition, cut-flow, ramp-down, shut-off, and post-flow. The process parameters can further include settings for the duration of the post-flow, supply-on, pre-flow, purge, pierce, creep, and ramp-down delay. FIG. 4 shows other process parameters generated in response to the user input process parameters. Upon receiving the user input to initiate the plasma arc system 10 and generating all of the parameters necessary to start the operation of the plasma arc system, the CNC 12 executes software programs to initiate and control the operation of the various components of the plasma arc system 10. The software program will be discussed in greater detail in reference to FIGS. 15–20.

Figure 5B:
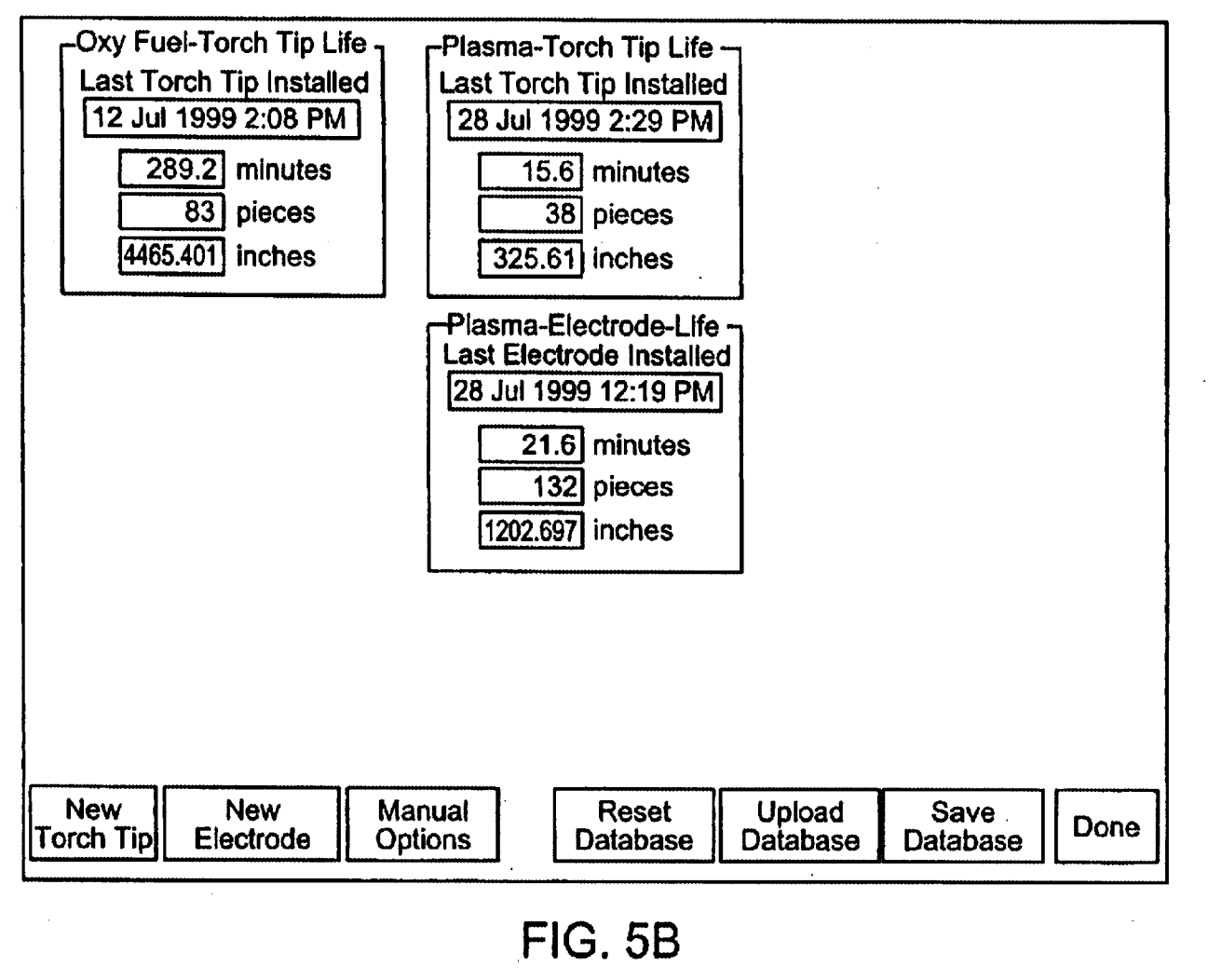

In one embodiment, the CNC 12 includes a database for tracking and recording consumable life. For example, if a new electrode or nozzle is placed in the plasma torch, this information is provided to the CNC 12. The database will record the date and time the consumable was changed and how long it lasted in minutes, pierces, inches and millimeters. An example of a change consumable screen provided by the CNC is shown in FIG. 5B.

Power Supply

Figure 6:
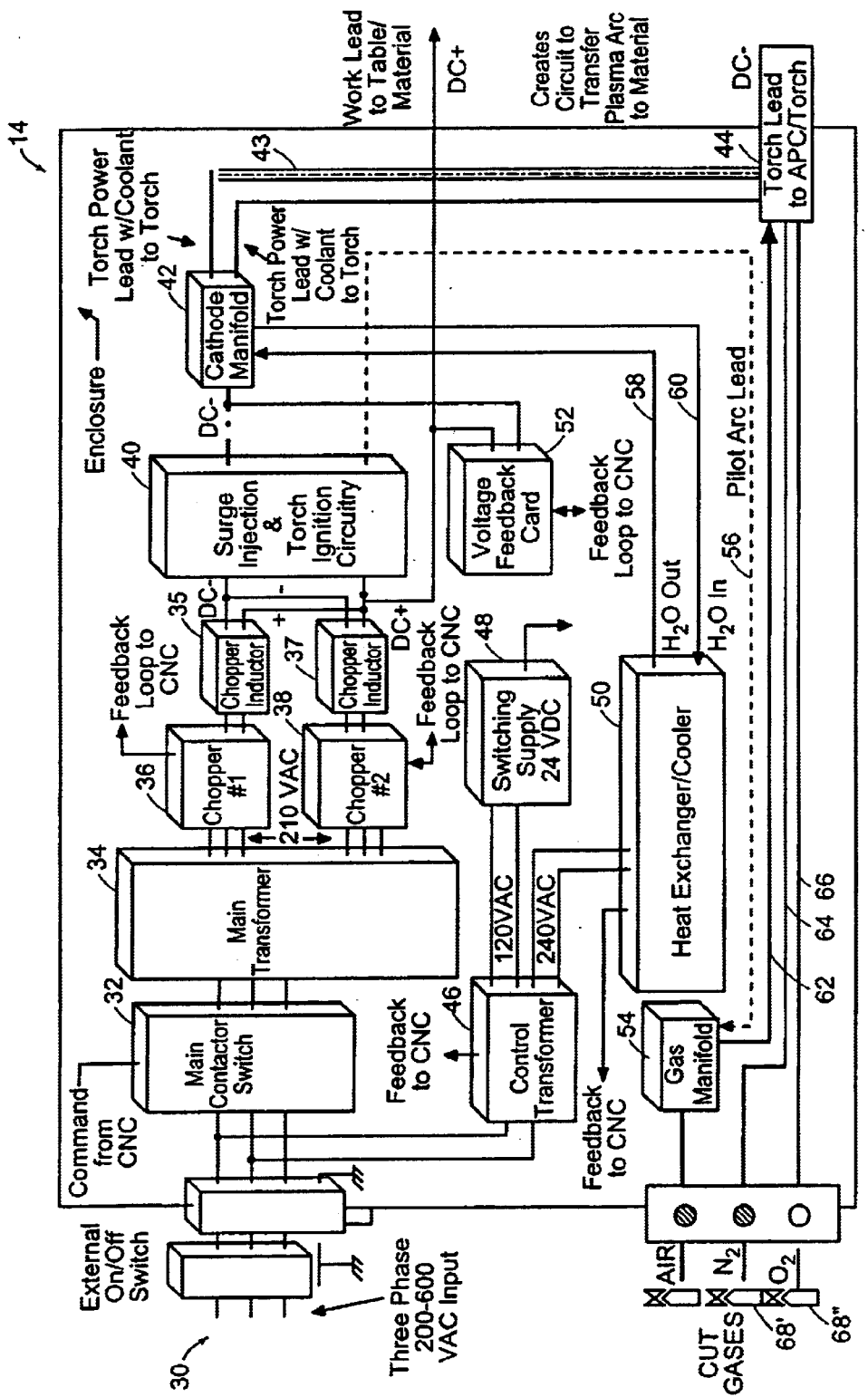
FIG. 6 is a block diagram illustrating a closed-loop power supply according to one embodiment of the present invention.

The purpose of a power supply 14 is to combine electrical power and gases to create an ionized gas for metal cutting. FIG. 6 shows an embodiment of the power supply 14 of the current invention. The electrical power of the power supply 14 is controlled by the CNC 12 (shown in FIG. 2), and the gas supply is controlled by the APC 16 (shown in FIG. 2).

Referring to FIG. 6, the power supply 14 includes a three phase power supply input 30. The three phase power supply input 30 is in electrical communication with a main contactor switch 32. The main contactor switch 32 is in electrical communication with a main transformer 34. The main transformer 34 is in electrical communication with a dc power module. The dc power module can be a chopper, an invertor or a silicon controlled rectifier. In the embodiment illustrated in FIG. 6, the dc power modules are a first chopper module 36 and a second chopper module 38. The first chopper module 36 and second chopper module 38 are in electrical communication with a first chopper inductor 35 and a second chopper inductor 37. The chopper inductors 35, 37 are in electrical communication with surge injection and torch ignition circuitry module 40. The surge injection and torch ignition circuitry module 40 is in electrical communication with the cathode manifold 42 which is in electrical connection with a torch power and coolant lead 43. A voltage feedback card 52 is in electrical communication with the surge injection and torch ignition circuitry module 40.

The power supply 14 also includes a control transformer 46 which is in electrical communication with the three phase power supply input 30. The control transformer 46 is in electrical communication with a switching supply 48 and a heat exchanger/cooler unit 50. A pair of coolant leads 58, 60 extend from the heat exchanger cooler unit 50 and the cathode manifold 42.

The power supply 14 also includes a gas manifold 54. A pilot arc lead 56 extends from the surge injection and torch ignition circuitry module 40 to the gas manifold 54. A shield gas and pilot arc lead 62 extends from the gas manifold 54 to the torch lead 44. The cut gas leads 64, 66 extend from the cut gas sources 68', 68" through the power supply 14 to the torch lead 44.

In operation, the three phase power supply input 30 receives an input signal. The input signal can be an AC signal within a voltage range from about 200 volts to 600 volts. The input 30 provides power to the main transformer 34 through the main contactor switch 32. The main transformer 34 converts the incoming power through two secondary windings (not shown). Each winding provides power to the chopper modules 36, 38. For example, the main transformer can provide 210 VAC signal to each chopper module 36, 38. The chopper modules 36, 38 provide the cutting voltage supplied to the torch 24. The three phase power supply input 30 also provides power to the control transformer 46 which converts the incoming power through two secondary windings (not shown) of the control transformer 46. The two secondary windings of the control transformer 46 provide power to both the heat exchanger or unit 50 and the switching supply 48. For example, the control transformer 46 can provide 120 VAC signal to the switch power supply 48 and 240 VAC signal to the heat exchanger/cooler unit 50. The switching supply 48 provides 24 VAC signal to the CNC 12 to provide additional power the CNC 12.

The chopper inductors 35, 37 provide rectified DC output signal to sustain the electric arc at the torch 24. The surge injection and torch ignition circuitry 40 provides the high frequency and initial surge current to ignite the torch 24.

The DC output signals of the chopper inductors 35, 37 are monitored by the voltage feedback card 52. When the power supply 14 is energized via the main contactor switch 52, the voltage feedback card 32 signals the CNC 12 that the power supply 14 is ready. When a pilot arc is established, the voltage feedback card 52 signals the CNC 12. When the cutting arc is established, the voltage feedback card 52 signals the CNC 12 to begin motion. Once transfer of the arc has occurred and motion is engaged, the voltage feedback card 52 is used to provide voltage feedback to the CNC 12, and the arc voltage is adjusted by the CNC 12 using the torch height control 18. If there is any failure during this process, the failure is detected by the CNC 12, the process is halted, and an error message is posted by the CNC 12.

The power supply 14 can operate in one of several ways. One way of operating the power supply 14 is in a full auto-mode. Once a part program and plasma process has been selected by the operator, simply push the START button and the CNC 12 will check to see if the power supply 14 is on and, if not, will energize the power supply 14 and verify its status. The CNC 12 will then continue executing the part program as normal. Any fault condition results in a power supply shut down, and an error message is provided to the operator.

The second way of operating the power supply 14 is in a remote manual mode. The operator can manually energize the power supply 14 by going to the diagnostics screen in the CNC 12 and selecting SUPPLY ON. This allows remote diagnostics and testing to be performed.

The third way of turning on the power supply 14 is in a local manual mode. A properly trained service agent can manually energize the power supply by opening the power supply 14 and engaging the SUPPLY ON relay.

During the power up sequence for the power supply 14, the CNC 12 receives signals that confirm the presence of the three phase power supply input 30. Without the signal from the power supply 14, the CNC 12 will time out, shut down, and alert the operator. In addition, all of the power supply's functions can be manually tested remotely from the CNC 12 by using the diagnostic screens provided by the CNC 12.

The voltage feedback card 52 can monitor the arc voltage at the plasma arc torch 24 remotely during a cut and use that information as a feedback signal to the torch height controller (THC) 18. Because the CNC 12 controls all aspects of the power supply's functions, the voltage feedback card 52 can also perform other functions provided herein.

Once the start command has been given, the CNC 12 will energize the main contactor switch 32, allowing the choppers 36, 38 to charge their output to a full open circuit voltage. The full open circuit is detected by the voltage feedback card 52 and the information is relayed to the CNC 12. If the full open circuit is within tolerance, and all other parameters are satisfied, the CNC 12 enables the choppers 36, 38 and passes down the output current set point. The CNC 12 then engages the surge injection/torch ignition circuitry 40 to generate a high frequency signal and enables pilot arc relay. In some embodiments the torch 24 may have a spring loaded mechanism to bring the electrode and nozzle in contact to form a pilot arc. When the pilot arc is established at the torch 24, the output voltage changes, and is detected by the voltage feedback card 52. The voltage feedback card 52 relays the voltage change to the CNC 12. As the arc stretches outward to the workpiece, it eventually contacts the workpiece, and the corresponding change in voltage is also detected by the voltage feedback card 52 which relays this information to the CNC 12. The CNC 12 uses this information as the arc transfer signal and proceeds with the piercing operation.

Once the piercing operation is completed and full machine motion is engaged and stable, the voltage feedback card 52 reverts back to its original function of torch height controller 18. A fault in any of the above conditions generates an appropriate error message to the operator and the system 10 returns to STANDBY mode.

The power supply 14 includes a novel cooling system. In a typical cooling system, a pump, a tank and other components are tied to chassis ground for safety reasons. Since the electrode is at an elevated voltage level during the plasma cutting operation, electrolysis occurs within the torch leads. Testing has shown that more than 95% of coolant loss is due to electrolysis. The heat exchanger/cooler unit 50 in the power supply 14 has been designed to eliminate electrolysis. By tying all of the heat exchanger/cooler unit 50 components to the electrode's potential, electrolysis can be prevented and the coolant can be preserved. Safety is maintained by placing the heat exchanger/cooler unit 50 within a separate enclosure with appropriate labeling.

The CNC 12 can directly monitor the flow rate, flow level, and temperature of the coolant and can intelligently respond to each fault situation to correct any deficiency. In the event of an over-temperature situation, the CNC 12 will allow the cutting operation to complete its current task. Afterward, the CNC 12 will alert the operator and command the power supply 14 to a STANDBY condition. This allows the power supply 14 to remain on and keep the fans running to cool down the coolant, but disables the output of the power supply 14. If the coolant level drops too low, the CNC 12 will allow the cutting operation to complete its current task. Afterward, the CNC 12 will alert the operator and command the power supply 14 to turn off. The CNC 12 will not allow the power supply 14 to turn on again until the low coolant level condition has been satisfied. If the CNC 12 detects loss of coolant flow, it will immediately end the cutting operation, shut down the power supply 14, and alert the operator.

The CNC 12 has a direct link to the choppers 36, 38 within the power supply 14 and feeds the choppers 36, 38 an analog signal proportional to the output current desired. This allows a near-infinite resolution in the current output. During such operations as ramp-up or ramp-down of the output current, very smooth transitions are possible. This reduces the stress on the consumables within the torch, thereby extending the useful life of the consumables.

Figure 7A:
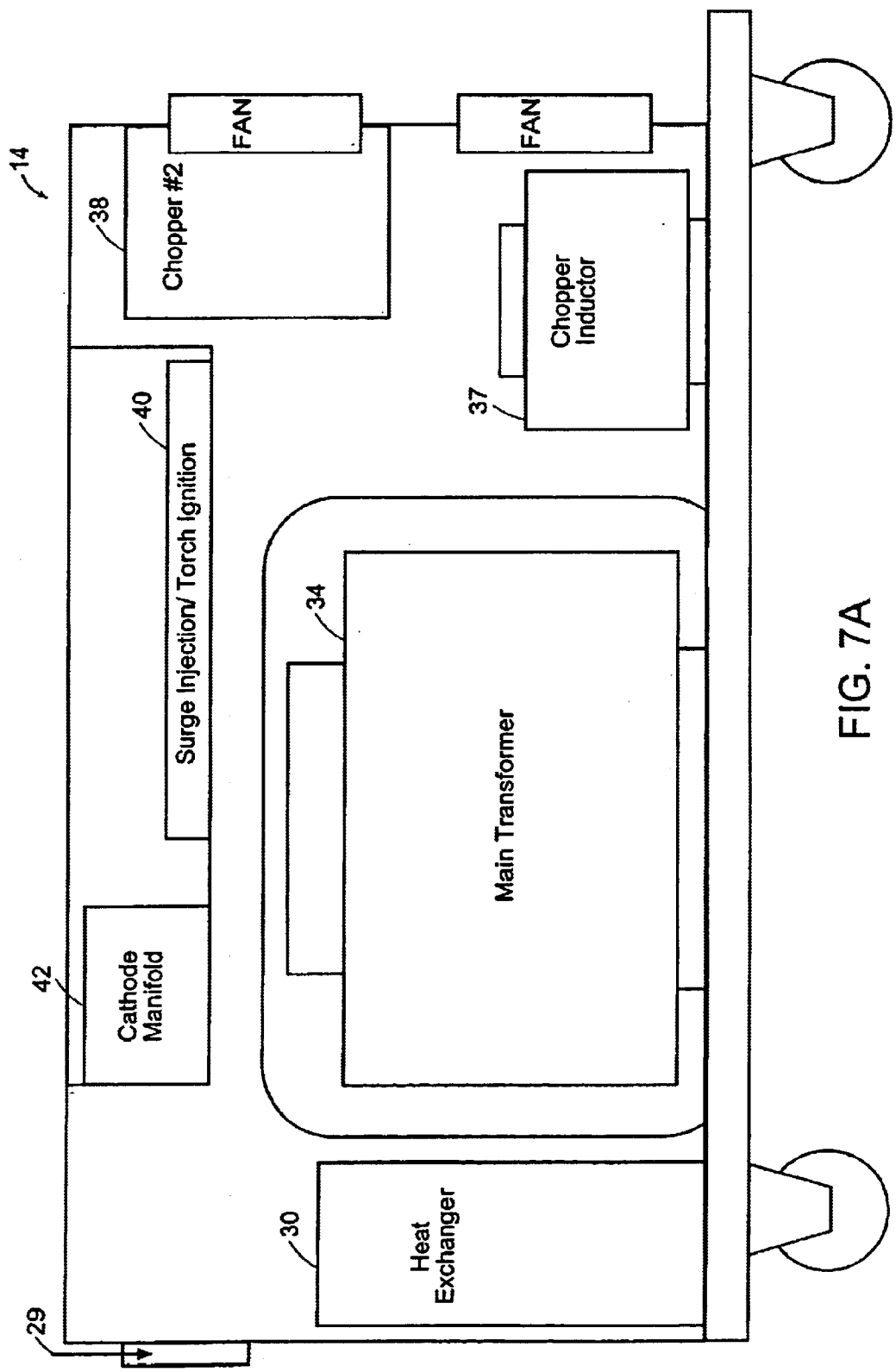
FIG. 7A is a schematic diagram of a side view of a closed-loop power supply according to one embodiment of the present invention.
Figure 7B:
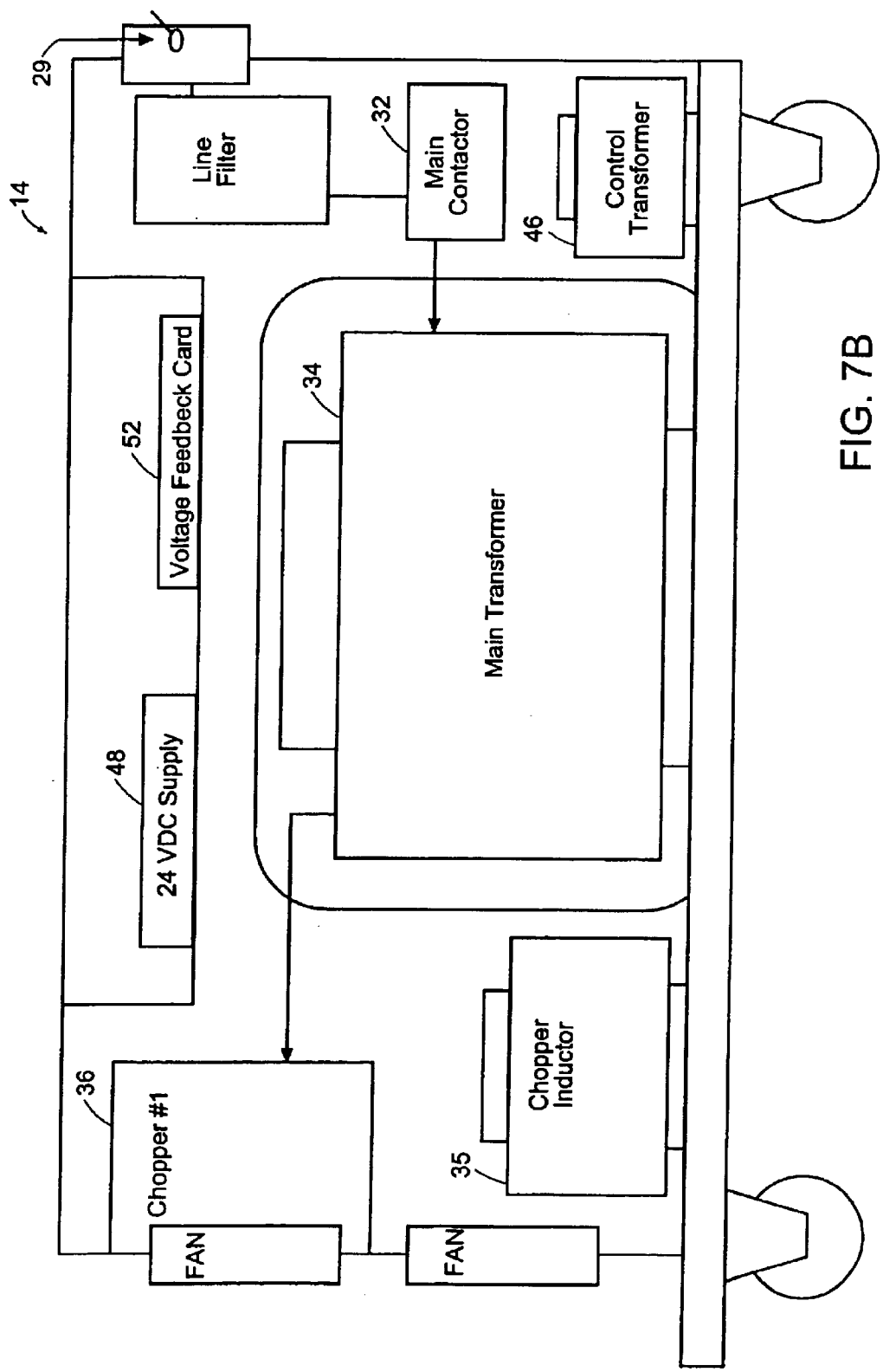
FIG. 7B is a schematic diagram of another side view of a closed-loop power supply according to one embodiment of the present invention.
Figure 7C:
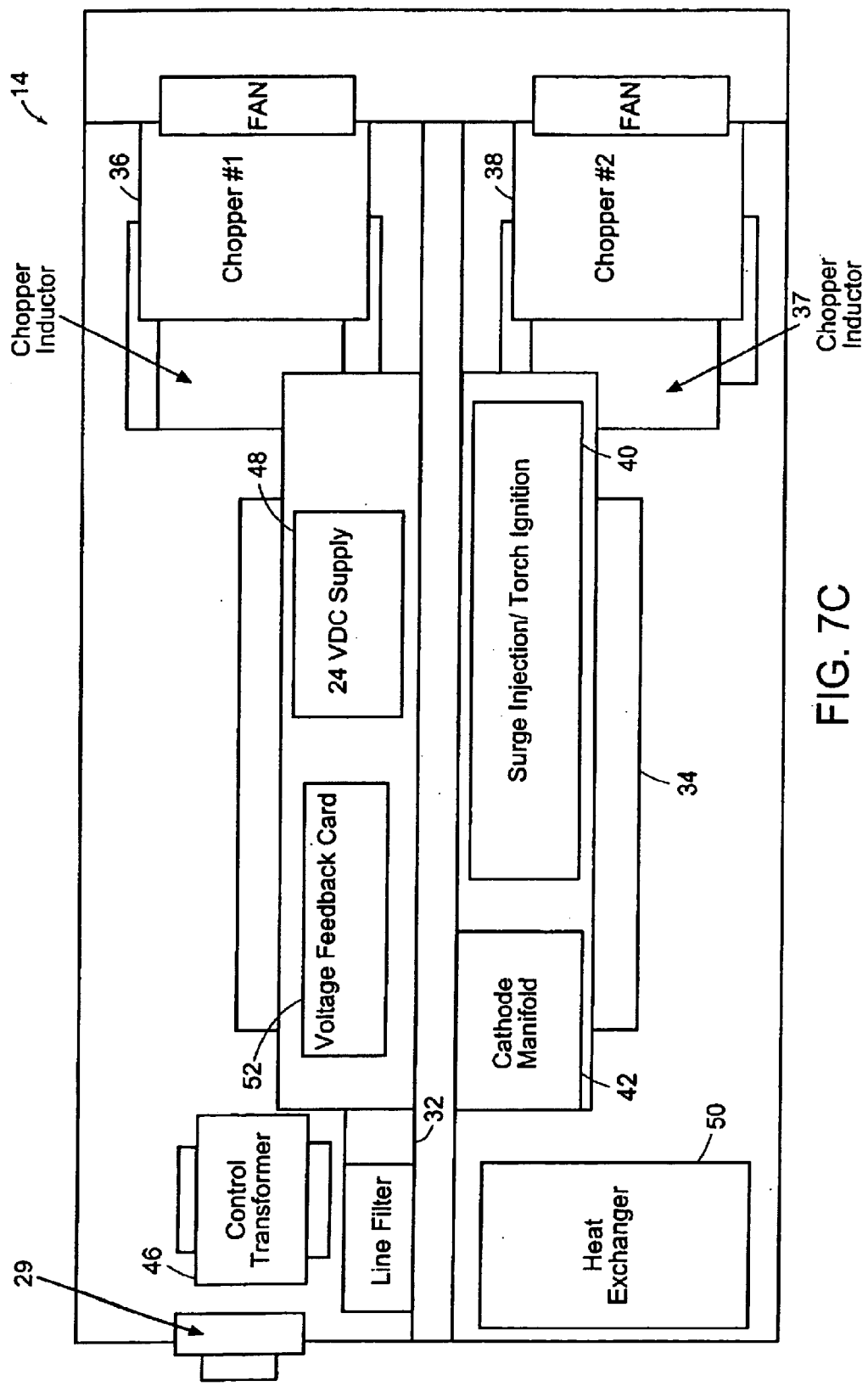
FIG. 7C is a schematic diagram of a top view of a closed-loop power supply according to one embodiment of the present invention.

FIGS. 7A–7C show physical placement of each of the components of the power supply 14. The specific placements of the components provided in FIGS. 7A–7C are exemplary only and other placements can be used in accordance with the present invention.

Automatic Process Controller

The automatic process controller 16 receives command signals from the computerized numeric controller (CNC) 12 to control the flow of gases into the plasma arc torch 24. The automatic process controller 16 eliminates the need for manually operated gas flow controls, typically located at the plasma power supply. The automatic process controller 16 replaces solenoid valves typically located at the power supply and/or gas control module with proportional flow control (PFC) valves that are located immediately prior to the body of the plasma arc torch 24.

Figure 8:
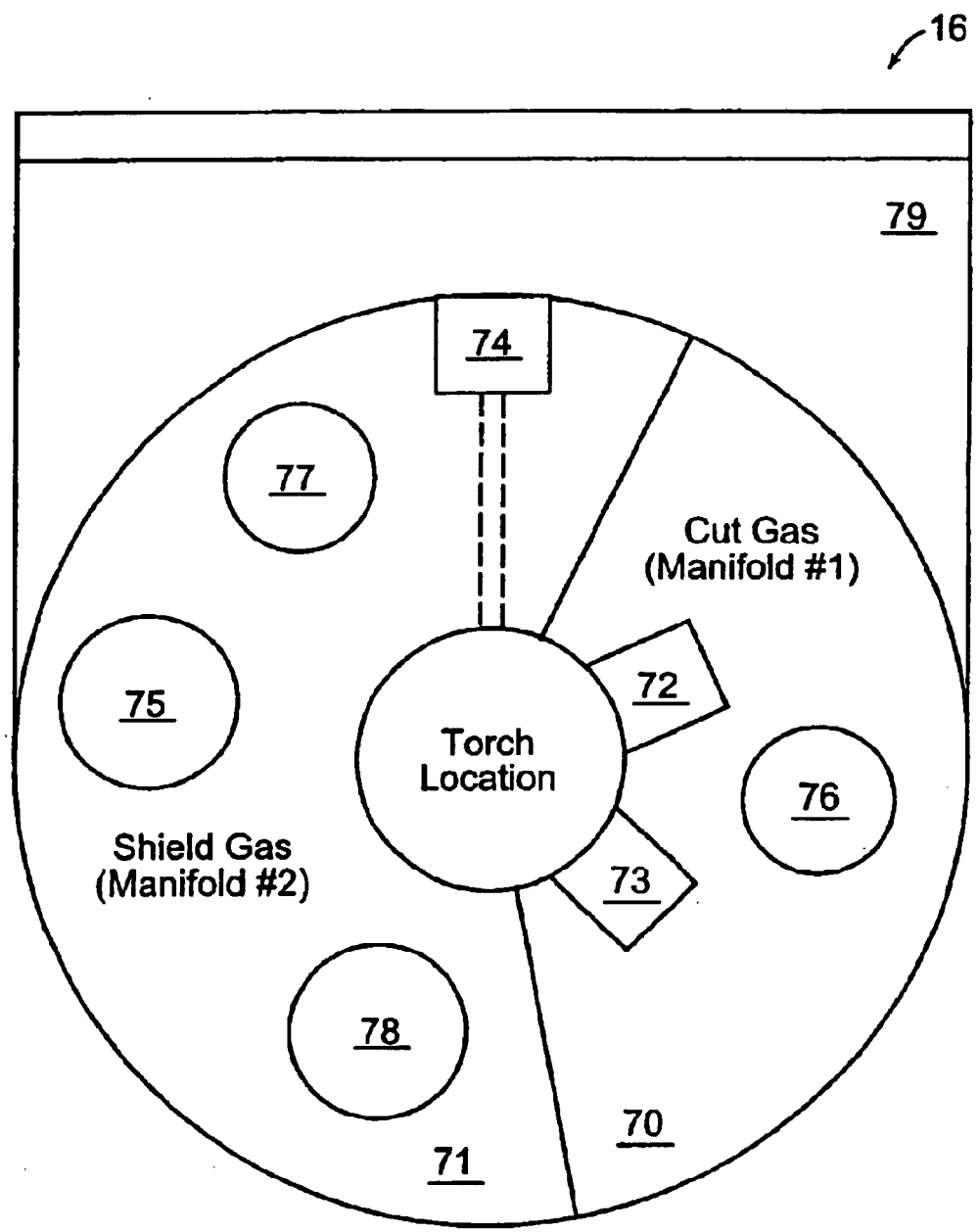
FIG. 8 is a schematic diagram of a top view of an automatic process controller according to one embodiment of the present invention.

FIG. 8 shows a top view of the automatic process controller 16. For clarity, gas hoses and hose connections are not shown. The automatic process controller 16 includes gas manifolds 70, 71, valves 72, 73, 74, 75, pressure transducers 76, 77, a pressure switch 78, and a bracket 79 for mounting the automatic process controller 16 to the torch height controller 18 shown in FIG. 13.

Figure 9:
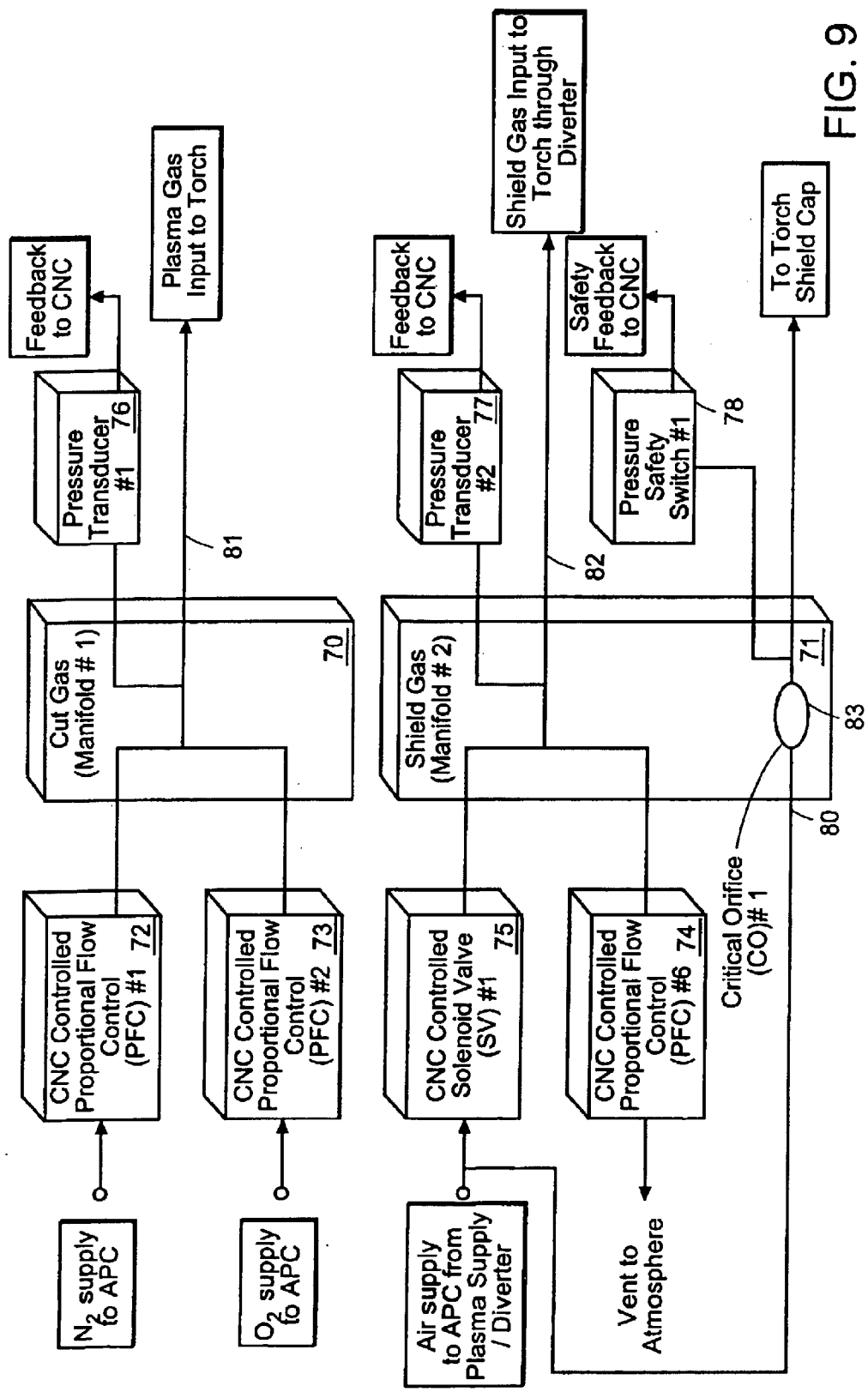
FIG. 9 is a block diagram illustrating an automatic process controller according to one embodiment of the present invention.

Referring to FIGS. 8 and 9, the automatic process controller 16 includes a first manifold 70 and a second manifold 71. The first manifold 70 is a chamber that allows blending and adjustment of one or more cut gasses provided to the plasma arc torch 24 through the use of flow control. The second manifold 71 is a chamber that allows adjustment of a shield gas provided to the plasma arc torch through the use of flow control. The automatic process controller 16 also includes a first proportional flow control (PFC) valve 72, a second proportional flow control (PFC) valve 73, and a third proportional flow control (PFC) valve 74. The first PFC valve 72 and the second PFC valve 73 are in physical communication with the first manifold 70. The first PFC valve 72 controls flow of a first cut gas. The second PFC valve 73 controls flow of a second cut gas. For example, the first cut gas can be nitrogen, and the second cut gas can be oxygen. The first cut gas and the second cut gas can be mixed in the first manifold 70.

The third PCF valve 74 is in physical communication with the second manifold 71, which is also in physical communication with a controlled solenoid valve 75. The controlled solenoid valve 75 controls application of a shield gas to the plasma arc torch. For example, the shield gas can be air. A portion of the shield gas can be vented to the atmosphere. The third PFC valve 74 controls the amount of shield gas vented to the atmosphere. Thus, the shield gas flow is controlled by purging the excess gas to the atmosphere.

The automatic process controller 16 can further include a first pressure transducer 76 and a second pressure transducer 77. Referring to FIG. 9, the first pressure transducer 76 taps into the line 81 inside the first manifold. The first pressure transducer 76 monitors an outlet pressure of either the first cut gas, the second cut gas, or a mixture of the first cut gas and the second cut gas. The pressure measurement from the first transducer 76 is provided to the CNC 12 as feedback. The CNC 12 can provide an adjustment command to the first PFC valve 72 and/or the second PFC valve 73 to adjust the cut gas flows if necessary. The second pressure transducer 77 is tapped into the line 82 inside the second manifold 71. The second pressure transducer 77 monitors the outlet pressure of the shield gas provided to the plasma arc torch 24. The pressure measurement from the second transducer 77 is provided to the CNC 12 as feedback. The CNC 12 can provide an adjustment command to the third PFC valve 74 to control the flow of the shield gas if necessary.

In operation, a user selects a cut program among many programs stored in the CNC 12 and selects certain process variables. For example, the user can select eight process variables. As discussed in reference to FIG. 4, these eight process variables include a power supply type, a torch type, a material type, a current setting, a plasma/shield gas type, a cutting surface, a material thickness and an installation of water muffler. The CNC 12 accesses an internal database and sets and adjusts the flow rates of the cut gas and the shield gas based on the process variables provided by the user. The database can be a factory default database or a user defined database. An example CNC display which illustrates parameter for gas control is shown in FIG. 4.

The CNC 12 provides command signals to the first PFC valve 72, the second PFC valve 73, the third PFC valve 74, and the controlled solenoid valve 75. In response to the command signals, the first PFC valve 72, the second PFC valve 73, and the third PFC valve 74 can adjust the flow of the applicable gas. A proportional solenoid valve allows the flow through the proportional solenoid valve to be controlled variably as opposed to a standard solenoid valve that is either completely closed or completely open. The structure and operation of an exemplary proportional solenoid valves are described in detail in U.S. Pat. No. 5,232,196, the contents of which are herein incorporated by reference.

Figure 10A:
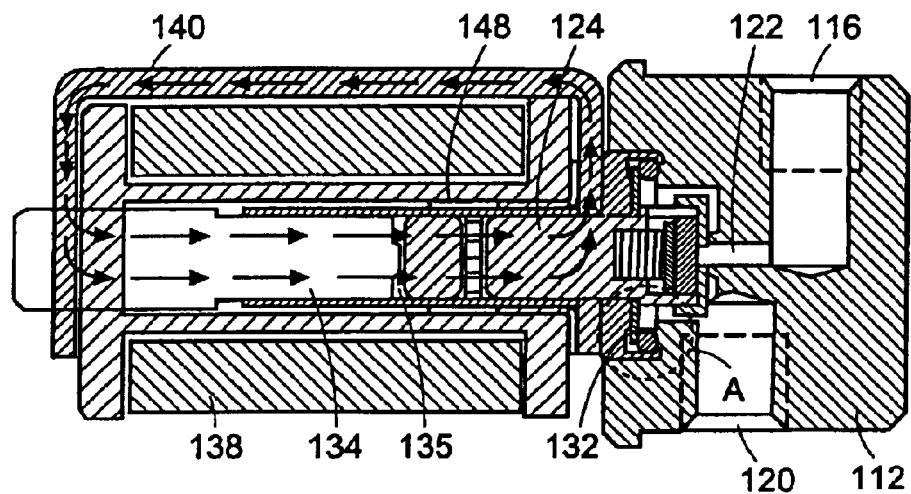
FIG. 10A is a cross-sectional view of a proportional flow control valve according to one embodiment of the present invention.
Figure 10B:
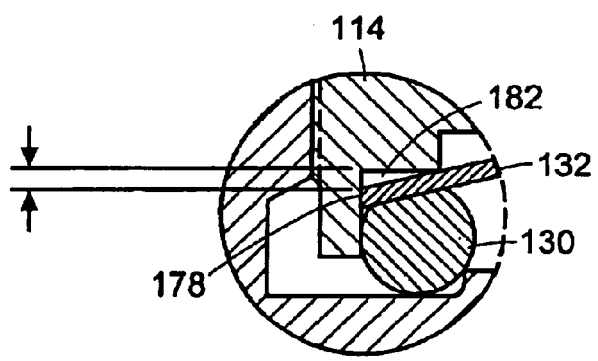
FIG. 10B is an exploded view of region A from FIG. 10A according to one embodiment of the present invention.

Referring to FIGS. 10A and 10B, a proportional solenoid valve includes a solenoid coil 138, an armature assembly 124, a yolk 140, a pole 134 and a flat spring 132. As the solenoid coil 138 is energized, the coil magnetomotive force induces a flux through yoke 140 and pole 134, across a working gap 135, through armature assembly 124, and back to yoke 140 via flux concentrator 148. The magnetic flux induces a force of attraction between the armature assembly 124 and the pole piece 134, causing the armature assembly 124 to move towards pole piece 134. As the armature assembly 124 displaces towards pole piece 134 and away from orifice 122 in the valve body 112, the flat spring 132 opposes the solenoid force and controls the magnitude of the net deflection of the armature assembly 124. Increasing the coil current increases the force of attraction between the armature assembly 124 and the pole piece 134, thereby increasing the movement of the armature assembly 124 towards pole piece 134. The flat spring 132 provides resistance to the force induced by the solenoid coil 138. The flat spring 132 is three-lobed and is constrained on its outer diameter in one of the six degrees of freedom. FIG. 10B illustrates how the outside diameter of the flat spring 132 is held between an O-ring 130 and a ledge of the armature assembly 178. As current is increased to the coil, the flow output of the valve increases proportionally. As current is decreased, the flow is decreased proportionally. The PFC valve described in reference to FIGS. 10A and 10B is exemplary only. Proportional solenoid valves operating under other principles or incorporating other structures can also be used in accordance with the present invention.

The solenoid valve 75 opens or closes depending on the command signal from the CNC 12. The solenoid valve 75 is a simpler valve than the proportional solenoid valves 72, 73, 74. The solenoid valve 75 does not have the flat spring configuration described in the proportional solenoid valves 72, 73, 74 to enable proportional flow control. Instead, the solenoid valve 75 has two positions, an open position and a closed position. For example, when the command signal is at state zero, the solenoid valve 75 is closed. When the command signal is at state one, the solenoid valve 75 is open.

The output of the gasses passing through the PFC valves 72, 73, 74 and the solenoid valve 75 are monitored by the pressure transducers 76, 77 and this information is communicated to the CNC 12. If necessary, the CNC 12 adjusts the command signals provided to the PFC valves 72, 73, 74 and the solenoid valve 75, thereby creating a closed-loop dynamic relationship between the CNC 12 and the automatic process controller 16. This dynamic relationship improves the plasma cutting process by more accurately controlling the plasma gas and shield gas flow into the plasma arc torch 24.

The pressure information gathered by the pressure transducers 76, 77 can also be used in adjusting other process parameters. In one embodiment, the motion speed and profile within a cut program 600 (FIG. 16) is used to adjust the process parameters for the automatic process controller 16 and torch height controller 18. For example, during a corner cutting operation, where the torch 24 enters and exits a corner, the speed of the torch 24 must be decreased and then increased, respectively. During this corner cutting operation, the zone of reduced speed causes the arc to remove too much material from the work piece resulting in a wider kerf width, inaccurate finished part dimensions, and a reductions in consumable life. The CNC 12 can now use the knowledge contained within the cut program 600 regarding cut path and speed, and adjust gas flows using the automatic process controller 16. The adjustment in gas flow then dictates a change in the arc current level from the power supply 14 and a change in the torch height using the torch height controller 18. These adjustments further dictate a change in cut program's 600 cut path to compensate for the change in kerf width. The result is an integrated cutting process.

In one embodiment, the automatic process controller 12 includes a safety feedback feature. In one embodiment, the safety feedback feature monitors air pressure at the shield cap by routing the shield gas through an orifice 83 provided in the line 80 passing through the second manifold 71. The orifice 83 restricts the shield gas flow. If the cap is removed the pressure drop is then monitored by a pressure safety switch 78. The pressure safety switch 78 indicates that the shield cap has been removed by sensing the pressure at the cap. If the proper pressure is not maintained at the shield cap, the power supply 14 is disabled and an error message appears on the CNC display 13. This safety feedback feature ensures that the shield cap is in place prior to starting the power supply 14 or when the power supply 14 is in use. The first pressure transducer 76 and the second pressure transducer 77 also act as safety monitors to ensure proper gas flow. If proper gas flow is not maintained, the process can be shut down by the CNC 12.

Figure 11B:
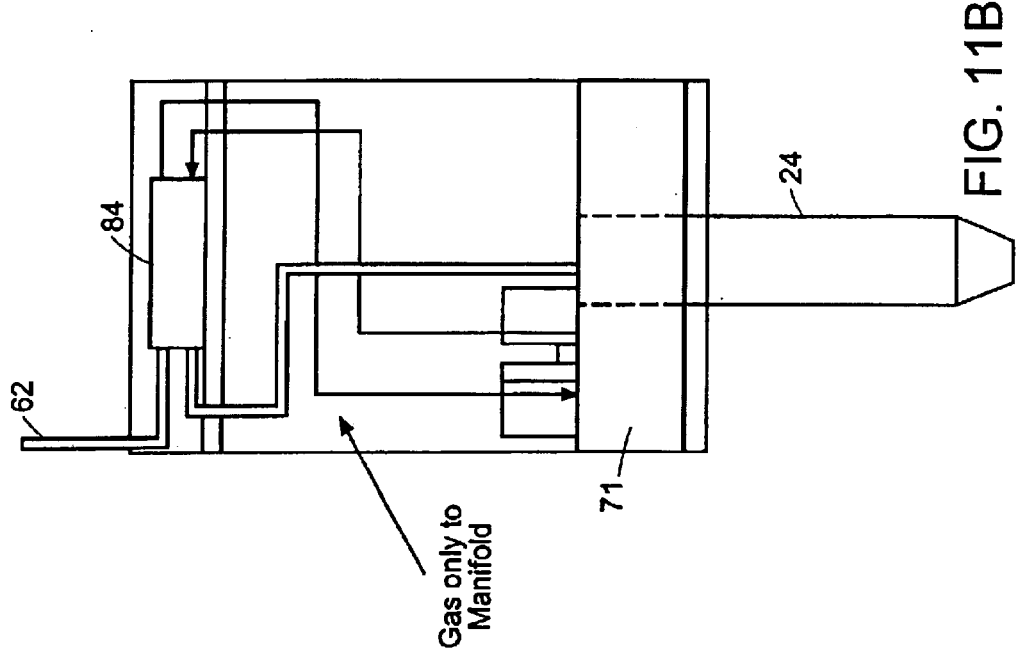
FIG. 11B is a schematic diagram of another side view of an automatic process controller according to one embodiment of the present invention.
Figure 11A:
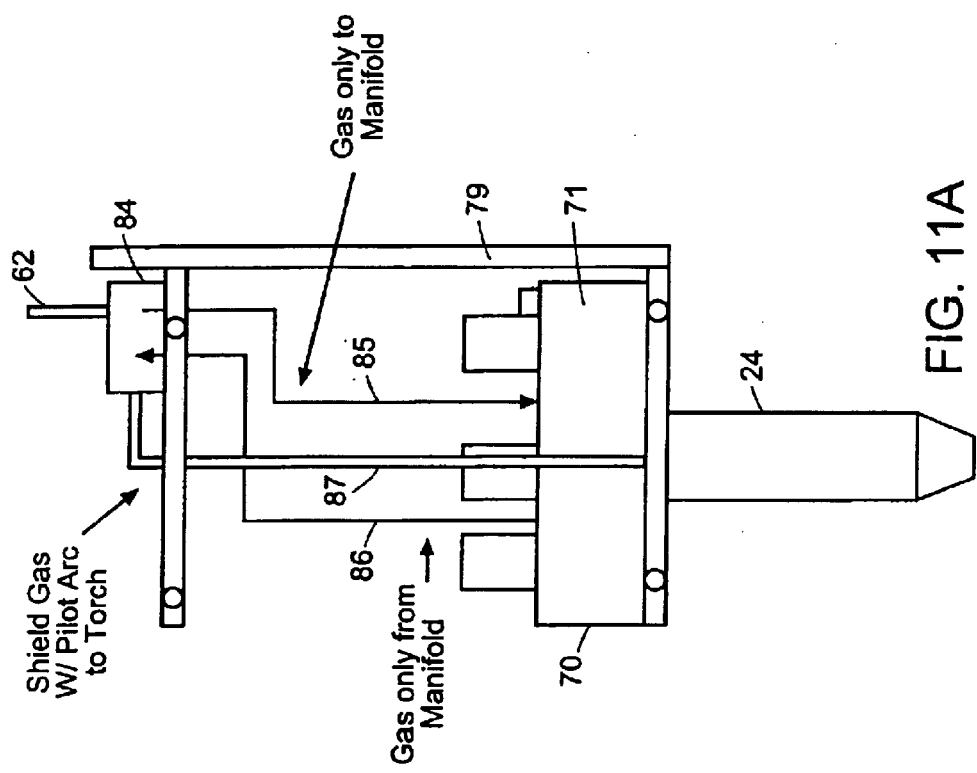
FIG. 11A is a schematic diagram of a side view of an automatic process controller according to one embodiment of the present invention.
Figure 12B:
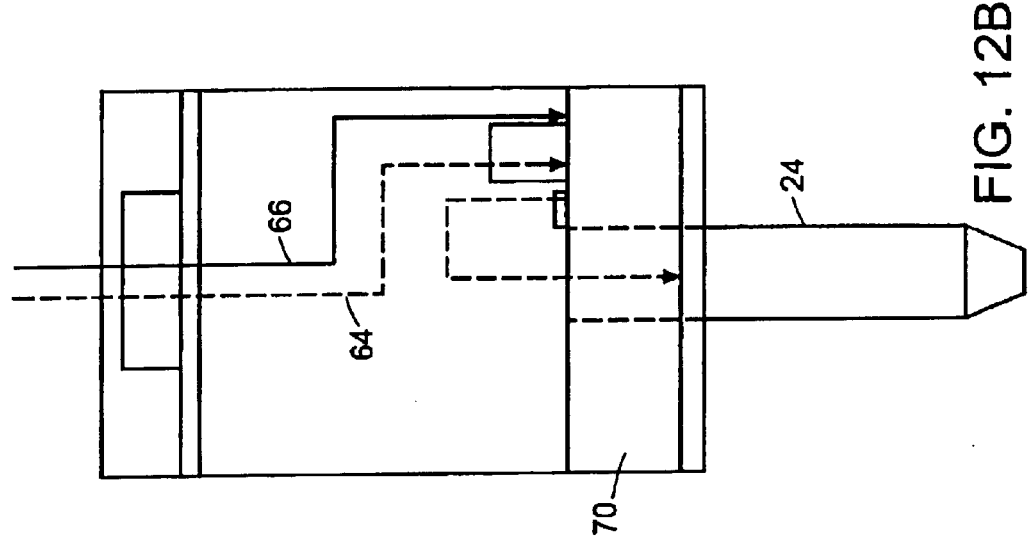
FIG. 12B is a schematic diagram of yet another side view of an automatic process controller according to one embodiment of the present invention.
Figure 12A:
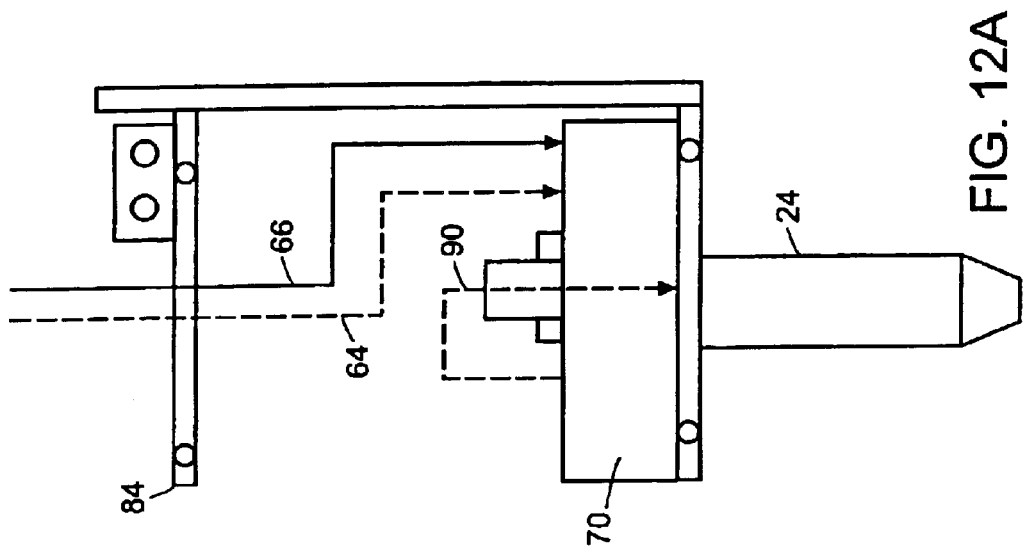
FIG. 12A is a schematic diagram of another side view of an automatic process controller according to one embodiment of the present invention.

In one embodiment, the automatic process controller 16 also includes a shield gas diverter manifold 84 shown in FIGS. 11A and 11B. The purpose of the shield gas diverter manifold 84 is to separate the shield gas from the pilot arc wire which are coupled in a line 62 extending from the power supply 14 shown in FIG. 6. The shield gas diverter manifold 84 is attached to the bracket 79. The bracket 79 is also attached to the shield gas manifold 71 and the cut gas manifold 70 of the automatic process controller 16. The shield gas diverter manifold 84 keeps the pilot arc wire away from the automatic process controller 16. Shield gas travels from the shield gas diverter manifold 84 to the automatic process controller 16 through line 85. The flow of shield gas is then adjusted in the shield gas manifold 71, and the adjusted shield gas is returned from the shield gas manifold 71 of the automatic process controller 16 to the shield gas diverter manifold 84 through line 86. The adjusted shield gas is then fed into one end of the torch lead 87 which also contains the pilot arc lead. The other end of the torch lead 87 is connected to the torch 24 for supplying the adjusted shield gas to the torch 24 as well as for placing the pilot arc lead into electrical contact with the torch nozzle. FIGS. 12A and 12B show a nitrogen line 64 and an oxygen line 66 supplying cut gas to the cut gas manifold 70. From the cut gas manifold 70, the cut gas is supplied to the torch 24 by line 90.

The automatic process controller 16 described herein provides several advantages. First, the cut quality is improved. The closed-loop execution of the cutting process based on monitoring the gas flow and controlling the gas flow based on continuous feedback improves cut quality. Automatic control, in contrast to manual control, of gas flow valves also improves accuracy. In addition, short leads from the manifolds 70, 71 to the plasma arc torch 24 provides nearly instantaneous response, further improving cut quality. Second, cycle time of the operation of the plasma arc system is reduced, since operator intervention is minimal and time for purging the gases is short due to reduced distance between the manifolds 70, 71 and the plasma arc torch 24. For example, typical plasma arc systems require purge time of several seconds in duration. The present invention, on the other hand, can establish a stable gas condition in less than about 200 milliseconds. By establishing a stable gas condition in a shorter period of time, the automatic process controller improves consumable life by minimizing unstable gas conditions. Third, the automatic process controller includes safety features. For example, the present invention prevents ignition of the plasma arc if there is insufficient gas flow, and generates an error message on the CNC display to alert the user. The present invention also disallows out-of-tolerance flow conditions, allowing the CNC to safely shut down the system without damaging the consumables of the plasma torch.

Torch Height Control

The purpose of a torch height controller 18 is to provide an optimum voltage for a desired metal cutting process. There is a direct relationship between cut voltage and a standoff. The standoff refers to the gap between the metal work surface and the torch electrode.

Figure 13:
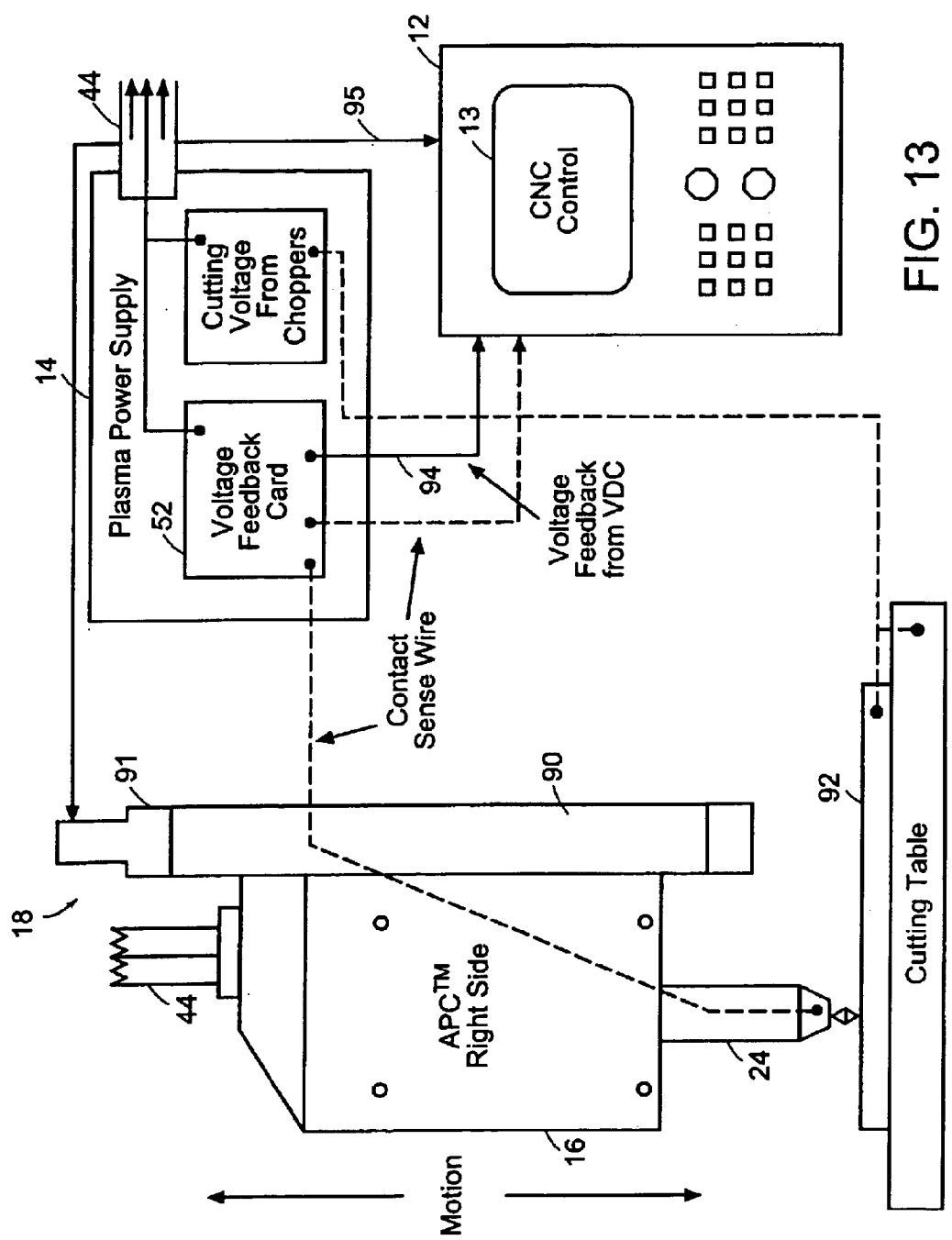
FIG. 13 is a schematic diagram illustrating an interaction between a torch height controller, a power supply and a CNC according to one embodiment of the present invention.
Figure 14:
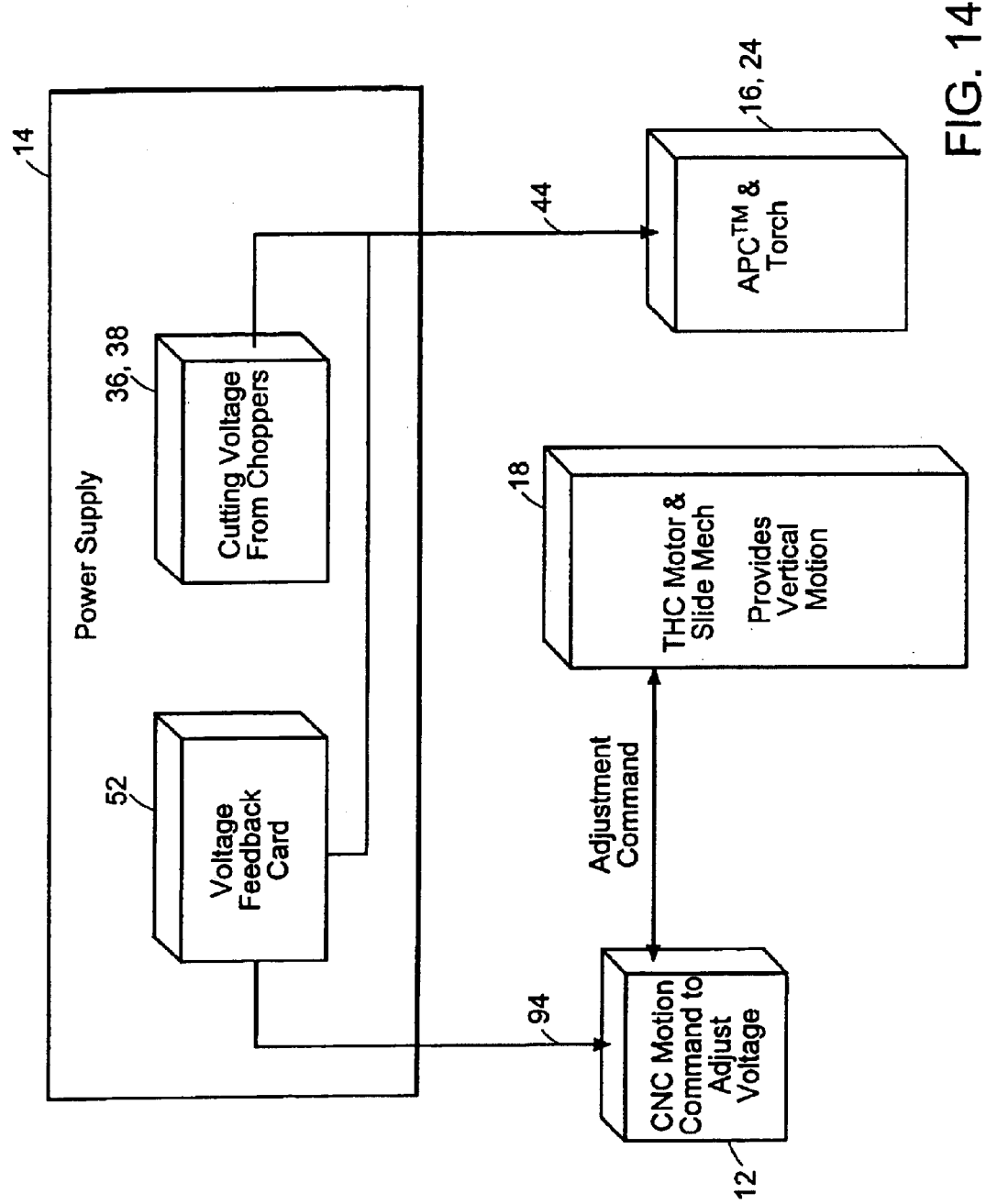
FIG. 14 is a block diagram illustrating a torch height controller according to one embodiment of the present invention.

Referring to FIGS. 13 and 14, the torch height controller (THC) 18 includes a mechanical slider or lifter 90 driven by a motor 91. The motor 91 is in electrical communication with the CNC 12. The plasma arc torch 24 is attached to the slider 90. An encoder provided inside the motor 91 is in electrical communication with the CNC 12. The encoder provides location information from the slider 90 back to the CNC 12. The torch 24 is in electrical communication with the voltage feedback card 52 provided inside the power source 14 and the CNC 12 to provide voltage information to the CNC 12. The CNC 12 uses the location information provided by the encoder, and voltage information provided by the voltage feedback card 52, in conjunction with a desired work piece cut path programmed into the CNC 12, to provide an input signal to the motor 91 to change the standoff.

To start the cutting process, the CNC 12 lowers the torch 24 until contact is made with a work piece 92. Once the torch 24 contacts the work piece 92, a signal is sent from the voltage feedback card 52 to the CNC 12 to indicate the position of the work piece 92.

After the torch 24 has contacted the work piece 92, the torch 24 is retracted to a pierce height as determined by the CNC 12. After the pilot arc in the torch 24 has transferred to a cutting arc, a signal 94 is sent from the voltage feedback card 52 to the CNC 12 allowing the CNC 12 to control the motion of the torch height controller 18.

The voltage feedback card 52 reduces the voltage read at the torch 24 by a ratio, which for example can be 40:1, to provide a low voltage signal 94 to the CNC 12. The CNC 12 then multiplies the reduced voltage by the inverse of the ratio of voltage reduction used in the voltage feedback card 52 to determine the exact cutting arc voltage. If the cutting arc voltage is not at a set voltage as determined by the CNC 12, based on a given part cutting program, the CNC 12 will send a signal 95 to the motor 91 to adjust the torch height controller 18 up or down to adjust the voltage. If the THC 18 is unable to respond to a command 95 from the CNC 12, or the cutting voltage is outside of set voltage tolerances programmed into the CNC 12, the CNC 12 will stop the present operation and post a fault message to the operator on a CNC display screen 13.

At the end of a cut segment, the torch 24 will be raised to travel over obstacles before beginning the initial pierce cycle for the next work piece, as the torch 24 can be programmed to be raised between work pieces. If the travel distance to the next part is short, as determined by the user, the full retraction and initial plate sensing may be bypassed allowing immediate positioning of the THC 18 at a pierce height and voltage to begin the next cutting cycle. This feature significantly improves the overall process time for cutting separate work pieces 92 on a plate.

In operation, if the torch 24 passes over an area on the plate where there is no metal, for example off the edge of a work piece 92, the CNC 12 will detect a large voltage spike. In response to the voltage spike, the CNC 12 will prevent motion of the THC 18 to prevent the THC 18 from driving the torch 24 into the workpiece 92.

In areas where the motion profile for a workpiece 92 is very intricate, for example sharp angles or curves, the torch motion will slow down. This slow down in torch motion causes more metal to be removed along the cut path which results in a wider cut path and increased voltage. The CNC 12 will prevent motion of THC 18 in areas with intricate motion profiles to prevent the THC 18 from driving the torch 24 into the workpiece 92.

In the event of a loss of the cutting arc, the loss is detected by the CNC 12 from a signal sent by the voltage feedback card 52, and the CNC 12 halts the cutting process and sends an error message to the operator on the display screen 13 of the CNC 12.

The CNC Programs

Figure 15:
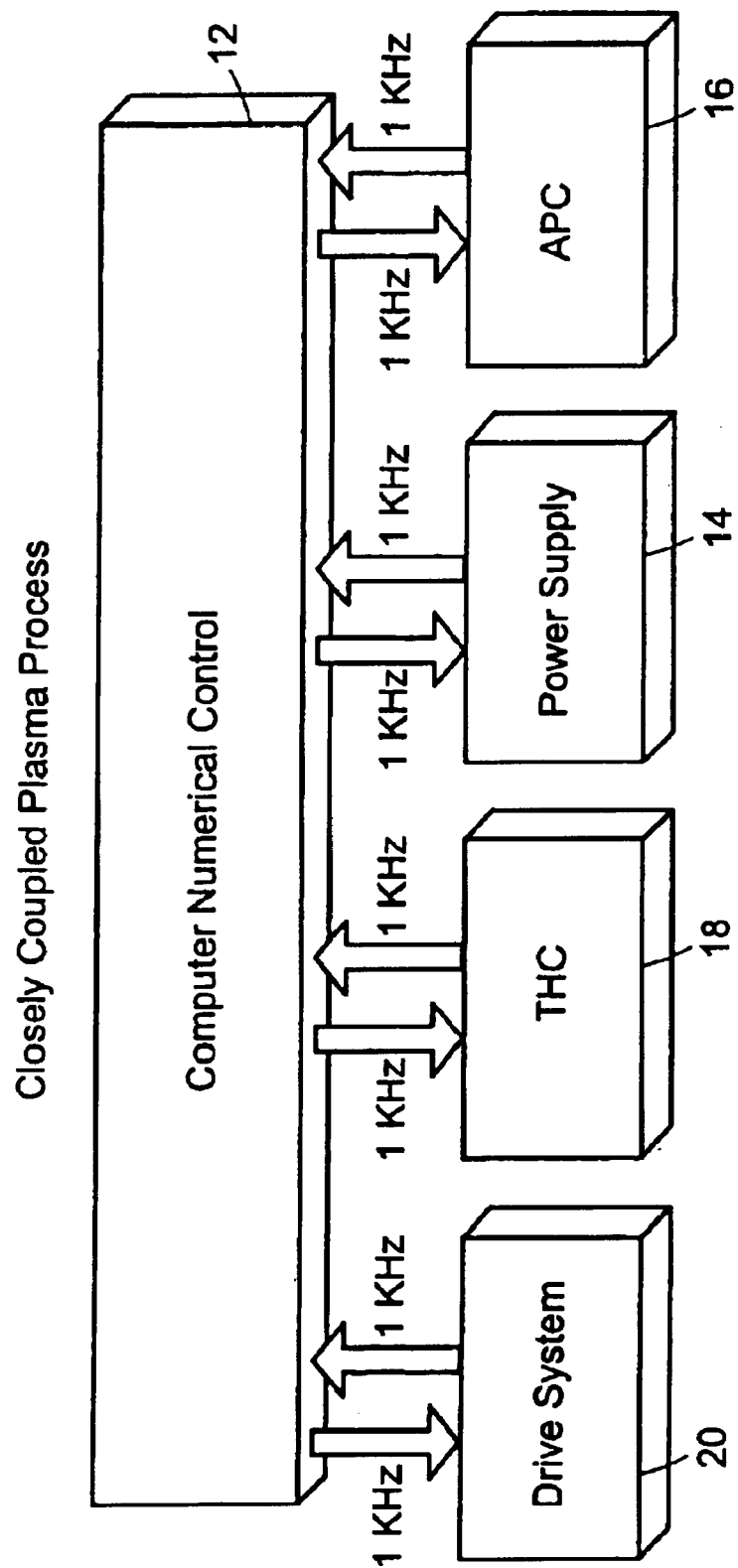
FIG. 15 is a flow chart illustrating a closely-coupled plasma process according to one embodiment of the present invention.
Figure 16:
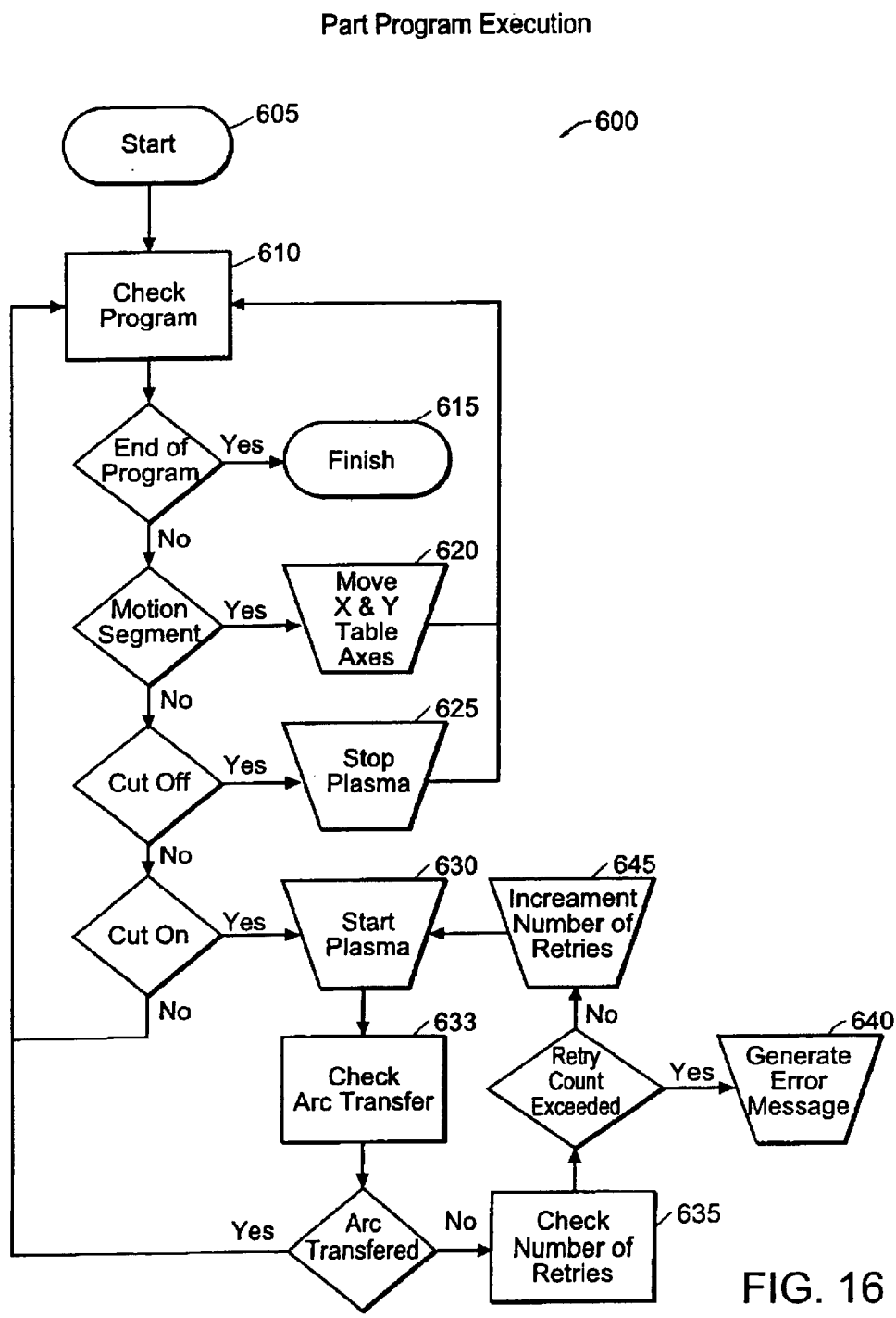
FIG. 16 is a flow chart illustrating a part program execution according to one embodiment of the present invention.

Upon receiving the user input to initiate the plasma arc system and generating all the parameters necessary to start the operation of the plasma arc system, the CNC 12 provides command signals to and receives feedback signals from each of the drive system 20, the torch height controller 18, the power supply 14 and the automatic process controller 16 as illustrated in FIG. 15. The CNC executes the routines illustrated in FIGS. 16–20. For example, the CNC performs these routines at 1 millisecond intervals for as long as the system is in operation.

The CNC executes the part program to provide information to the closely-coupled plasma arc system 10 for cutting a desired shape in a workpiece. Referring to the flow chart shown in FIG. 16, upon receiving the start command (step 605), the CNC 12 checks a cut program to determine if the cut program has been completed (step 610). If all the operations are completed, the program ends (step 615). If the cut program is not completed, the CNC 12 then checks the motion segment of the cut program to determine if the gantry and torch must be moved. If the gantry and torch must be moved, the CNC 12 provides a command to move the gantry and torch (step 620), and then the CNC 12 returns to check program (step 610) to determine if the cut program has been completed. If the gantry and torch do not have to be moved, the CNC 12 then determines if the plasma arc must be cut off. If the plasma arc must be cut off, the CNC 12 provides a command to stop the plasma arc (step 625) and then the CNC 12 returns to check program (step 610) to determine if the cut program has been completed. If the plasma arc does not have to be cut off, the program then checks to see if the plasma arc has to be started. If the plasma arc does not have to be started, the CNC 12 returns to check program (step 610) to determine if the cut program has been completed. If the plasma arc has to be started, the CNC 12 provides a command to start the plasma arc (step 630), and checks for arc transfer from the pilot arc to the work piece 633. If the arc has transferred to the work piece, the CNC 12 returns to the check program (step 610) to determine if the cut program has been completed. If the pilot arc does not transfer, the CNC 12 checks the number of retries (step 635). If the number of retry counts has been exceeded, an error message is displayed on the CNC display (step 640). If the number of retries has not been exceeded, the number of retries is incremented (step 645) and the plasma arc start (step 635) is retried.

Figure 17:
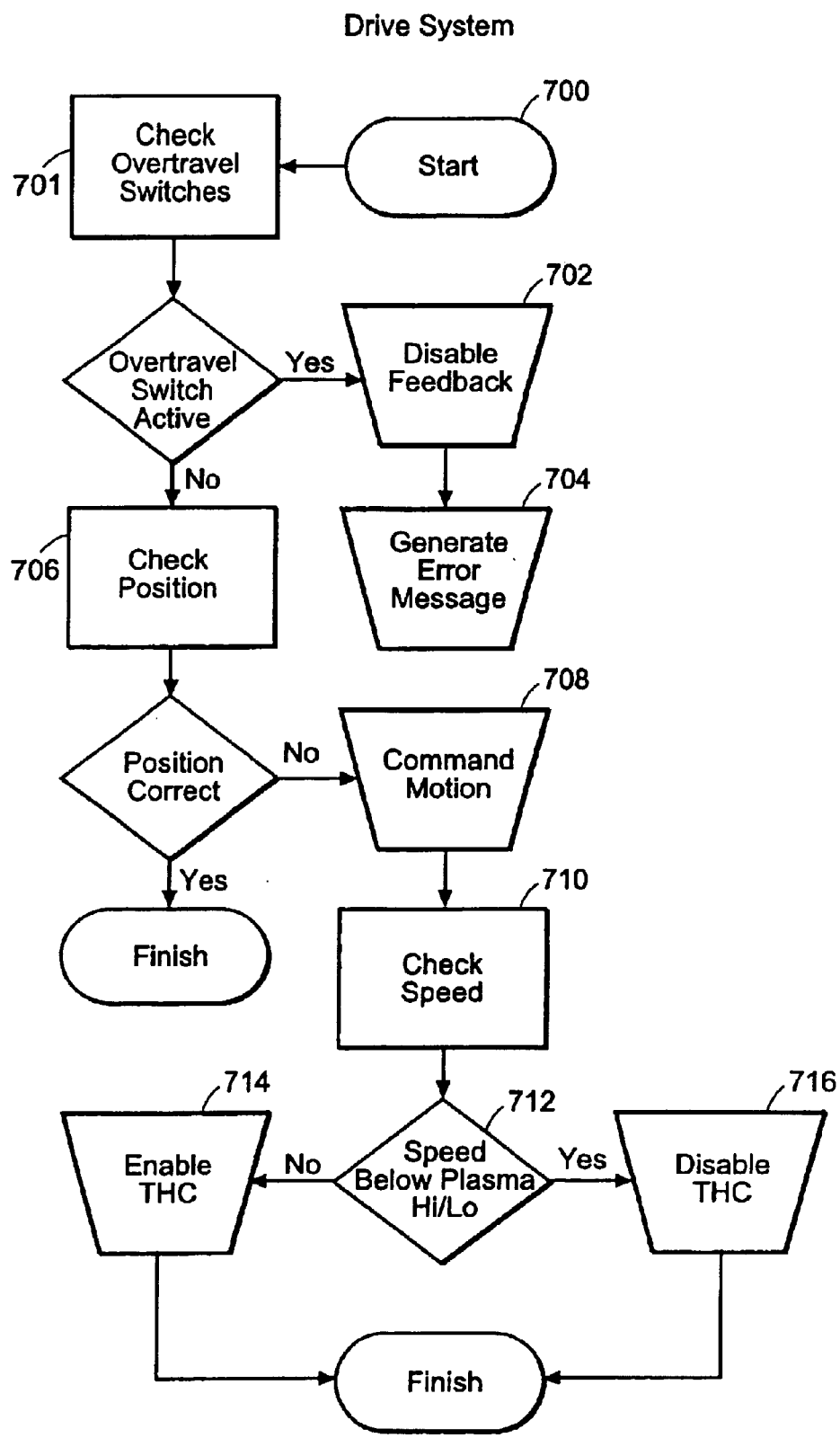
FIG. 17 is a flow chart illustrating control of a drive system according to one embodiment of the present invention.

The CNC 12 executes a routine illustrated in FIG. 17 for operating the drive system. Referring to the flow chart shown in FIG. 17, upon receiving the start command (step 700), the CNC 12 checks the overtravel switches located at each end of the gantry and the rail (step 701). If the overtravel switches are active, then a feedback signal is provided to the CNC 12 to disable the system 10 (step 702) and to generate an error message on the display 13 of the CNC 12 (step 704). If the overtravel switches are not active, the CNC checks the position of the torch 24 and the gantry 26 using an encoder in a servo loop with the motors (step 706). If the position is accurate, a single run through the routine for the driver system 20 is complete. If the position is incorrect, the CNC 12 provides a command signal to the driver system 20 to move the gantry 26 and/or the torch 24 (step 708). The CNC 12 checks the speed of the torch system (step 710). If the speed is above plasma hi/lo, above a user defined speed, for example 90% of a design speed (step 712), then the torch height controller 18 is enabled (step 714) and the routine is complete. If the speed is below the user defined speed, the torch height controller 18 is disabled (step 716) and the routine is complete. The CNC 12 repeats the routine for the drive system 20 for as long as the plasma system is in operation.

Figure 18:
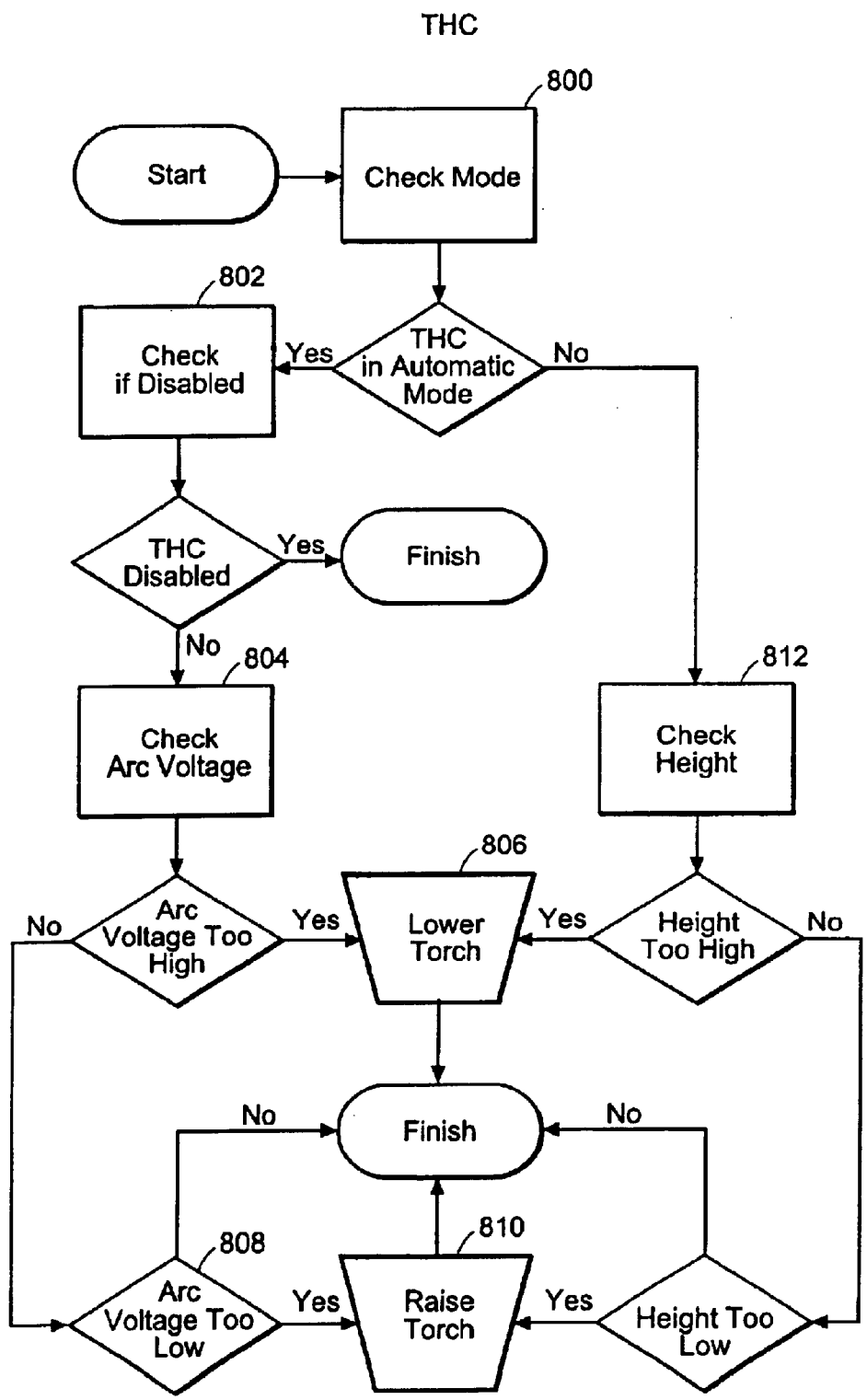
FIG. 18 is a flow chart illustrating control of a torch height control according to one embodiment of the present invention.

The CNC 12 executes a routine illustrated in FIG. 18 for operating the torch height controller 18. Upon receiving a start signal, the CNC 12 checks the operation mode (step 800). If the operation mode is in automatic mode, the CNC 12 checks to see whether the torch height controller 18 is disabled (step 802). If the torch height controller 18 is disabled, the routine is complete. If the torch height controller is not disabled, the CNC 12 checks the arc voltage (step 804). If the arc voltage is too high, the torch height controller 18 lowers the plasma arc torch 24 (step 806) and the routine is complete. If the arc voltage is not too high, the CNC 12 checks the arc voltage to determine whether the arc voltage is too low (step 808). If the arc voltage is not too low, then the routine is complete. If the arc voltage is too low, then the torch height controller 18 raises the plasma arc torch 24 (step 810) and the routine is complete. If the torch height controller 18 is not in the automatic mode (step 800), then the CNC 12 sets the torch height by raising the torch as high as possible to a known location, and then the torch is lowered to touch the work piece. Then the torch is raised to a desired location and the torch height is checked (step 812). If the torch height is too high, then the torch height controller lowers the plasma arc torch 24 (step 806) and the routine is complete. If the torch height is not too high, then the CNC 12 checks to see whether the torch height is too low. If the torch height is not too low, then the routine is complete. If the torch height is too low, then the torch 24 is raised (step 810) and the routine is complete. The CNC 12 repeats the routine for the torch height controller 18 for as long as the plasma arc system 10 is in operation.

Figure 19:
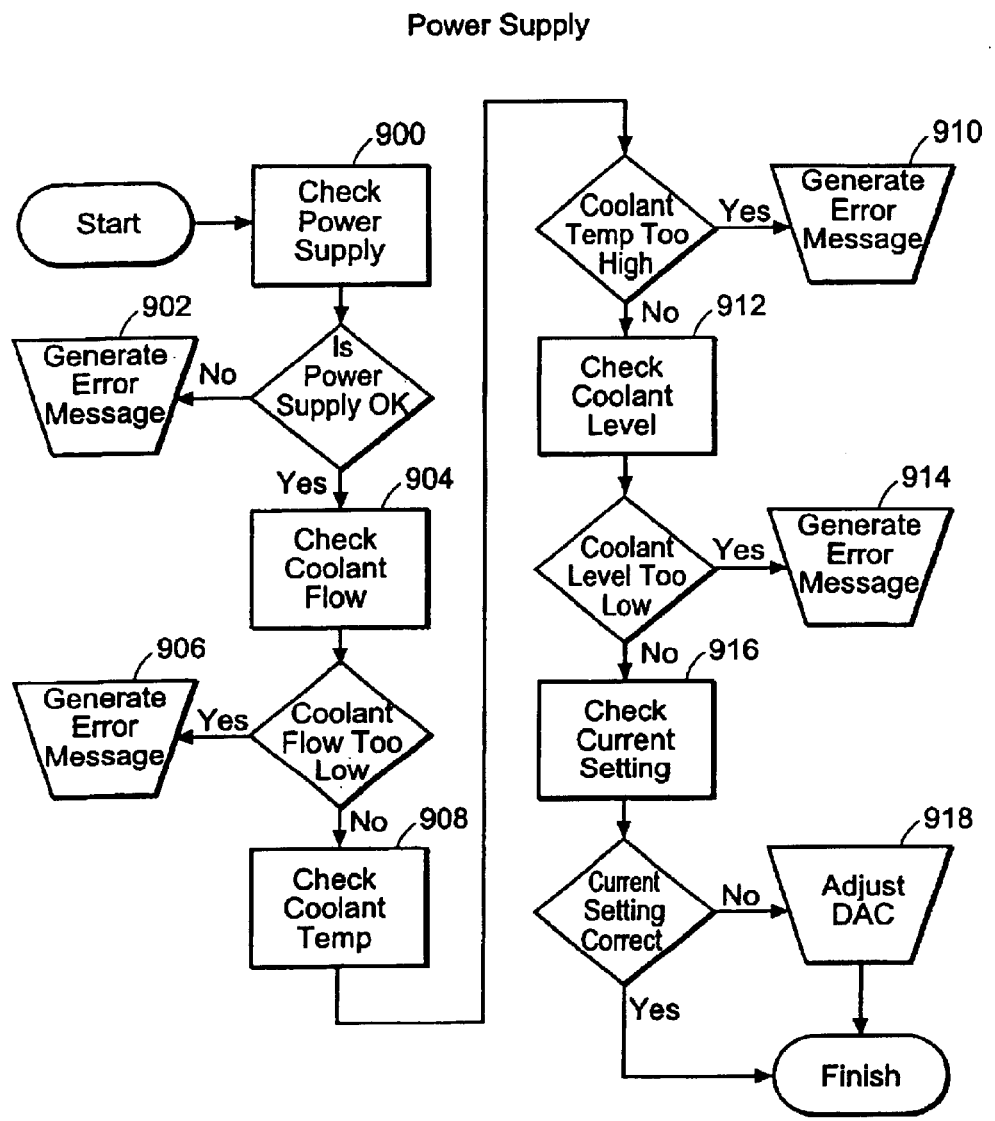
FIG. 19 is a flow chart illustrating control of a power supply according to one embodiment of the present invention.

The CNC 12 operates the power supply 14 by executing the routine shown in FIG. 19. The CNC 12 checks the status of the power supply 14 (step 900). If the power supply 14 does not have a ready condition, the CNC 12 generates an error message (step 902). If the power supply 14 does have a ready condition, the CNC 12 moves on to check coolant flow error (step 904). If the coolant flow is too low, then the CNC 12 generates an error message (step 906). If the coolant flow is sufficient, the CNC 12 checks the coolant temperature (step 908). If the coolant temperature is too high, the CNC 12 generates an error message (step 910). If the coolant temperature is sufficient, the CNC 12 checks the coolant level (step 912). If the coolant level is too low, the CNC 12 generates an error message (step 914). If the coolant level is sufficient, the CNC 12 checks the current setting (step 916). If the current setting is incorrect, the CNC 12 sends a command signal to adjust digital to analog converter located in the controller to send an analog signal to the chopper (step 918). If the current setting is correct, the routine is complete. The CNC 12 repeats the routine for controlling the power source.

Figure 20:
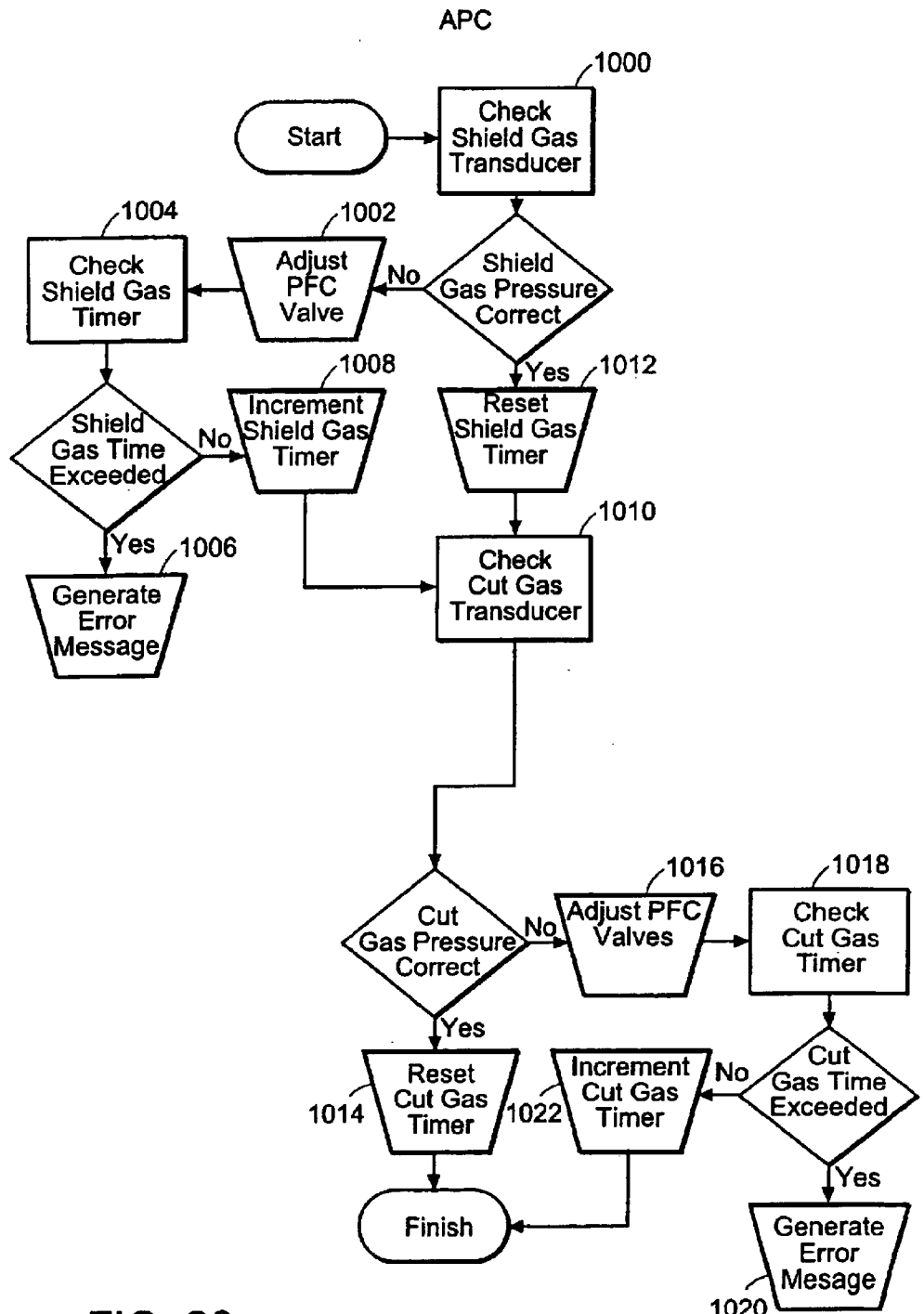
FIG. 20 is a flow chart illustrating control of automatic process control according to one embodiment of the present invention.

The CNC 12 controls the operation of the automatic process controller 16 by executing the routine shown in FIG. 20. The CNC 12 checks the pressure of the pressure transducer for the shield gas (step 1000). If the shield gas pressure measured at the transducer is incorrect, the CNC 12 generates and applies a command signal to adjust the PFC valve 74 (shown in FIG. 8) for the shield gas (step 1002). The CNC 12 checks the shield gas timer located in the CNC 12 (step 1004) and if the shield gas timer has been exceeded, the CNC 12 generates an error message (step 1006). If the shield gas timer has not been exceeded, the CNC 12 increments the shield gas timer because a fault condition has not been encountered (step 1008). The CNC 12 moves on to check the cut gas pressure (step 1010). If the shield gas pressure is correct, the CNC 12 resets the shield gas timer (step 1012). After resetting the shield gas timer, the CNC 12 checks the cut gas pressure (step 1010) to determine if cut gas pressure is correct. If the cut gas pressure is correct, the CNC 12 resets the cut gas timer (step 1014) and the routine is complete. If the cut gas pressure is incorrect the CNC 12 adjusts PFC valves 72, 73 in the cut gas manifold 70 (step 1016). After adjusting the PFC valves 72, 73 in the cut gas manifold 70, the CNC 12 checks the cut gas timer (step 1018). If the cut gas time has been exceeded, the CNC 12 generates an error message (step 1020). If the cut gas timer has not been exceeded, the CNC 12 increments the cut gas timer (step 1022) and the routine for controlling the APC 16 is complete. The CNC 12 repeats the routine for controlling the APC 16 during the entire operation of the torch to control the cut gas and the shield gas flow.

Doctrine of Equivalents

While the invention has been particularly shown and described with reference to specific preferred embodiments, it should be understood by those skilled in the art that various changes in form and detail may be made therein without departing from the spirit and scope of the invention as defined by the appended claims. For example, the centralized control architecture described herein can be useful in operating other metal processing systems, such as a plasma arc welding system.

What is claimed is:

1. A method of controlling an operation of a plasma arc torch system, the method comprising:
   a) providing a closed-loop electrical connection between an automatic process controller and a computerized numeric controller, wherein the automatic process controller is in fluidic communication with a plasma arc torch and comprises at least one valve and at least one sensor;
   b) providing a command signal from the computerized numeric controller to the at least one valve to control a flow of at least one gas to the plasma arc torch;
   c) monitoring a condition of the at least one gas exiting the automatic process controller using the at least one sensor; and
   d) adjusting the command signal provided to the at least one valve by the computerized numeric controller based on the monitored condition of the at least one gas.

2. The method of claim 1 wherein step c) comprises monitoring the condition of at least one cut gas.

3. The method of claim 1 wherein step c) comprises monitoring the condition of a shield gas.

4. The method of claim 1 wherein step b) comprises providing a first command signal to a first valve to control the flow of a cut gas and providing a second command signal to a second valve to control the flow of a shield gas; step c) comprises monitoring a pressure of the cut gas using a first pressure transducer and monitoring a pressure of the shield gas using a second pressure transducer; and step d) comprises adjusting a first command signal provided to the first valve based on the pressure of the cut gas monitored by the first pressure transducer and adjusting a second command signal provided to the second valve based on the pressure of the shield gas monitored by the second pressure transducer.

5. A control system for controlling an operation of a plasma arc system comprising:
   an automatic process controller including at least one valve for controlling a flow of at least one gas to a plasma arc torch and at least one sensor for monitoring a condition of the at least one gas; and
   a computerized numeric controller in closed-loop electrical communication with the automatic process controller, the computerized numeric controller generating at least one command signal for operating the at least one valve, receiving the condition of the at least one gas monitored by the at least one sensor, and adjusting the command signal for operating the at least one valve based on the condition of the at least one gas monitored by the at least one sensor.

6. The control system of claim 5 wherein the at least one valve comprises a proportional flow control valve.

7. The control system of claim 5 wherein the at least one sensor comprises a pressure transducer.

8. The control system of claim 5 wherein the at least one valve comprises a first proportional flow control valve for controlling flow of a first cut gas, a second proportional flow control valve for controlling flow of a second cut gas, and a solenoid valve for controlling flow of a shield gas.

9. The control system of claim 7 wherein the pressure transducer detects presence of a cut gas prior to an ignition of a plasma arc.

10. The control system of claim 7 wherein the pressure transducer detects presence of a cut gas during a cutting procedure.

11. The control system of claim 5 wherein the automatic process controller comprises a first manifold for controlling flow of a cut gas and a second manifold for controlling flow of a shield gas.

12. The control system of claim 11 wherein the cut gas comprises a first cut and a second cut gas that are mixed in the first manifold.

13. The control system of claim 8 further comprising a third proportional flow control valve to control exhausting of an excess of at least one of the shield gas and the cut gas.

14. The control system of claim 11 further comprising a safety feature wherein the safety feature includes an orifice in the second manifold for controlling flow of the shield gas to a shield cap in the plasma torch and a pressure switch for measuring a pressure of the shield gas.

15. The control system of claim 5 wherein the computerized numeric controller generates the command signal based on a pre-selected operation program.

16. The control system of claim 5 wherein the computerized numeric controller sets and actively maintains a pre-determined pressure of the gas upstream of the plasma arc torch.

17. The control system of claim 7 wherein the computerized numeric controller adjusts the command signal provided to the at least one valve based on a pressure measured by the pressure transducer.

* * * * *